(12) United States Patent
Ishihara et al.

(10) Patent No.: US 10,676,091 B2
(45) Date of Patent: Jun. 9, 2020

(54) VEHICLE CONTROL APPARATUS

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Hisashi Ishihara, Toyoake (JP); Takahiro Kimura, Tajimi (JP); Masato Yoshikawa, Toyota (JP); Nobufusa Kobayashi, Anjo (JP); Kenta Kumazaki, Anjo (JP); Kazuomi Okasaka, Anjo (JP); Atsushi Kayukawa, Anjo (JP); Daisuke Suyama, Anjo (JP); Mitsuru Maeda, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 148 days.

(21) Appl. No.: 16/058,615

(22) Filed: Aug. 8, 2018

(65) Prior Publication Data

US 2019/0047565 A1 Feb. 14, 2019

(30) Foreign Application Priority Data

Aug. 8, 2017 (JP) .................................. 2017-153720

(51) Int. Cl.
*B60W 30/18* (2012.01)
*B60W 10/115* (2012.01)
(Continued)

(52) U.S. Cl.
CPC ...... *B60W 30/18036* (2013.01); *B60W 10/08* (2013.01); *B60W 10/115* (2013.01);
(Continued)

(58) Field of Classification Search
None
See application file for complete search history.

(56) References Cited

U.S. PATENT DOCUMENTS

| 6,729,198 B2 | 5/2004 | Brandt |
| 8,386,140 B2 * | 2/2013 | Tsuda ...................... B60K 6/48 |
| | | 180/65.21 |

(Continued)

FOREIGN PATENT DOCUMENTS

| JP | H06-284510 A | 10/1994 |
| JP | H08-163713 A | 6/1996 |

(Continued)

OTHER PUBLICATIONS

Apr. 4, 2019 Office Action issued in U.S. Appl. No. 15/828,615.
(Continued)

*Primary Examiner* — Dirk Wright
(74) *Attorney, Agent, or Firm* — Oliff PLC

(57) ABSTRACT

A control apparatus for a vehicle includes a vehicle driving control portion configured to permit reverse driving of the vehicle in a reverse direction while the automatic transmission is placed in a forward-drive low-speed gear position, with the motor/generator being operated in a negative direction to generate a negative torque, and a transmission shifting control portion configured to implement a control for promotion to establish the forward-drive low-speed gear position, when switching from forward driving of the vehicle to its reverse driving of the vehicle is required in the process of a shifting action of the automatic transmission to the forward-drive low-speed gear position. The transmission shifting control portion implements the control for promotion to establish the forward-drive low-speed gear position, according to a state of control of the engaging-side coupling
(Continued)

device to be brought into its engaged state for establishing the forward-drive low-speed gear position.

9 Claims, 8 Drawing Sheets

(51) Int. Cl.
*B60W 20/00* (2016.01)
*B60W 30/19* (2012.01)
*B60W 10/08* (2006.01)
*F16H 3/66* (2006.01)
*B60K 6/365* (2007.10)
*B60K 6/445* (2007.10)
*B60K 6/54* (2007.10)
*B60K 6/547* (2007.10)
*F16H 3/72* (2006.01)

(52) U.S. Cl.
CPC ...... *B60W 20/00* (2013.01); *B60W 30/18072* (2013.01); *B60W 30/19* (2013.01); *F16H 3/66* (2013.01); *B60K 6/365* (2013.01); *B60K 6/445* (2013.01); *B60K 6/547* (2013.01); *B60K 2006/541* (2013.01); *B60W 2510/1005* (2013.01); *B60W 2510/1015* (2013.01); *B60W 2540/16* (2013.01); *B60W 2710/083* (2013.01); *B60W 2710/1005* (2013.01); *B60W 2710/1011* (2013.01); *B60W 2710/1022* (2013.01); *B60W 2710/1083* (2013.01); *B60Y 2200/92* (2013.01); *F16H 3/727* (2013.01); *F16H 2200/0043* (2013.01); *F16H 2200/2007* (2013.01); *F16H 2200/2041* (2013.01); *F16H 2200/2066* (2013.01); *F16H 2200/2082* (2013.01)

(56) References Cited

U.S. PATENT DOCUMENTS

| | | | |
|---|---|---|---|
| 8,886,423 | B1 | 11/2014 | Dlugoss et al. |
| 9,061,675 | B2 | 6/2015 | Dlugoss |
| 9,090,247 | B2 | 7/2015 | Kato et al. |
| 2018/0148064 | A1* | 5/2018 | Goto .................... B60W 10/08 |
| 2018/0154796 | A1 | 6/2018 | Kumazaki et al. |

FOREIGN PATENT DOCUMENTS

| | | |
|---|---|---|
| JP | 2007-153269 A | 6/2007 |
| JP | 2009-166643 A | 7/2009 |
| JP | 2013-095316 A | 5/2013 |
| JP | 2018-090104 A | 6/2018 |

OTHER PUBLICATIONS

Jul. 29, 2019 Office Action issued in U.S. Appl. No. 15/828,615.
Oct. 17, 2019 Notice of Allowance issued in U.S. Appl. No. 15/828,615.
Jan. 8, 2020 Corrected Notice of Allowance issued in U.S. Appl. No. 15/828,615.

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2017-153720 filed on Aug. 8, 2017, the disclosure of which is herein incorporated by reference in its entirety.

FIELD OF THE INVENTION

The present invention relates to a control apparatus for a vehicle provided with a motor/generator and an automatic transmission through which a drive force of the motor/generator is transmitted.

BACKGROUND OF THE INVENTION

There is well known a control apparatus for a vehicle provided with a motor/generator functioning as a drive power source, and an automatic transmission which constitutes a part of a power transmitting path between the motor/generator and drive wheels and which is shifted to a selected one of a plurality of gear positions with an engaging action of one of a plurality of coupling devices. A control apparatus disclosed in JP-2009-166643A is an example of this type of control apparatus for a vehicular power transmitting apparatus. The control apparatus disclosed in this document is configured to implement a coasting shift-down action of the automatic transmission to a first-speed gear position such that a coupling device for establishing the first-speed gear position is brought into its fully engaged state by raising an engaging hydraulic pressure of the coupling device when an input speed of the automatic transmission has been raised to a target value during a rise of the input speed toward a synchronizing speed of the first-speed gear position with an increase of an input torque of the automatic transmission by an increase of an output torque of a second motor/generator connected to an input shaft of the automatic transmission.

By the way, the vehicle may be driven in a backward or rearward direction while the automatic transmission is placed in a forward-drive low-speed gear position (first speed gear position, for example). The vehicle is driven in the rearward direction with the motor/generator being operated in a negative direction (opposite to a positive direction for forward driving of the vehicle) to generate a negative torque (opposite to a positive torque for the forward driving). In this case, if the motor/generator initiates the generation of the negative torque as a result of an operation of a shift lever to a reverse drive position (in response to a requirement for reverse driving of the vehicle) in the process of a shifting action of the automatic transmission to the forward-drive low-speed gear position, it is difficult for an input speed of the automatic transmission to approach a synchronizing speed of the forward-drive low-speed gear position, so that it is difficult to establish the forward-drive low-speed gear position, giving rise to a risk of delay of generation of a reverse drive force (reverse drive torque) by the motor/generator.

SUMMARY OF THE INVENTION

The present invention was made in view of the background art described above. It is therefore an object of the present invention to provide a control apparatus for a vehicle, which permits reduction of a risk of delay of generation of a reverse drive force when reverse driving of the vehicle is required in the process of a shifting action of an automatic transmission to a forward-drive low-speed gear position.

The object indicated above is achieved according to the following modes of the present invention:

According to a first mode of the invention, there is provided a control apparatus for a vehicle provided with a motor/generator functioning as a drive power source, and an automatic transmission which constitutes a part of a power transmitting path between the motor/generator and drive wheels and which is shifted to a selected one of a plurality of gear positions with an engaging action of one of a plurality of coupling devices, the control apparatus comprising: a vehicle driving control portion configured to permit reverse driving of the vehicle in a reverse direction while the automatic transmission is placed in a forward-drive low-speed gear position of the plurality of gear positions, with the motor/generator being operated in a negative direction opposite to a positive direction for forward driving of the vehicle, to generate a negative reverse driving torque opposite to a positive forward driving torque for the forward driving; and a transmission shifting control portion configured to implement a control for promotion to establish the forward-drive low-speed gear position of the automatic transmission, when switching from the forward driving of the vehicle to the reverse driving of the vehicle is required in the process of a shifting action of the automatic transmission to the forward-drive low-speed gear position, the transmission shifting control portion implementing the control for promotion to establish the forward-drive low-speed gear position, according to a state of control of an engaging-side coupling device to be brought into its engaged state for establishing the forward-drive low-speed gear position.

According to a second mode of the invention, the control apparatus according to the first mode of the invention is configured such that the transmission shifting control portion implements the control for promotion to establish the forward-drive low-speed gear position, by implementing a compensation control to raise an engaging pressure of the engaging-side coupling device.

According to a third mode of the invention, the control apparatus according to the second mode of the invention is configured such that the state of control of the engaging-side coupling device is represented by the engaging pressure of the engaging-side coupling device at a moment at which the switching to the reverse driving of the vehicle is required, and such that the transmission shifting control portion increases an amount of rise of the engaging pressure of the engaging-side coupling device by the compensation control, with a decrease of the engaging pressure at the moment at which the switching to the reverse driving of the vehicle is required.

According to a fourth mode of the invention, the control apparatus according to the second mode of the invention is configured such that the state of control of the engaging-side coupling device is represented by a kind of control to establish the forward-drive low-speed gear position, and the transmission shifting control portion changes an amount of compensation to raise the engaging pressure of the engaging-side coupling device according to the kind of control to establish the forward-drive low-speed gear position.

According to a fifth mode of the invention, the control apparatus according to the fourth mode of the invention is configured such that when a coasting shift-down action of the automatic transmission to the forward-drive low-speed gear position is implemented, the transmission shifting control portion commands the motor/generator to temporarily increase the forward driving torque so as to be larger than a required value, to temporarily increase an input torque of the automatic transmission, for thereby raising an input speed of the automatic transmission toward a synchronizing speed of the forward-drive low-speed gear position, and brings the engaging-side coupling device into the engaged state when the input speed has been raised to a predetermined value, and such that when a manual shift-down action of the automatic transmission to the forward-drive low-speed gear position is implemented as a result of an operation of a manually operated shifting member by an operator of the vehicle, the transmission shifting control portion controls the engaging-side coupling device to be brought into the engaged state, by raising the engaging pressure of the engaging-side coupling device to raise the input speed of the automatic transmission toward the synchronizing speed of the forward-drive low-speed gear position, and further such that when the coasting shift-down action of the automatic transmission to the forward-drive low-speed gear position is implemented, the transmission shifting control portion determines the amount of compensation to raise the engaging pressure of the engaging-side coupling device such that the amount of compensation is larger when the coasting shift-down action is implemented than when the manual shift-down action is implemented.

According to a sixth mode of the invention, the control apparatus according to the first mode of the invention is configured such that the state of control of the engaging-side coupling device is represented by a kind of control to establish the forward-drive low-speed gear position, and such that when a coasting shift-down action of the automatic transmission to the forward-drive low-speed gear position is implemented, the transmission shifting control portion commands the motor/generator to temporarily increase the forward driving torque so as to be larger than a required value, to temporarily increase an input torque of the automatic transmission, for thereby raising an input speed of the automatic transmission toward a synchronizing speed of the forward-drive low-speed gear position, and brings the engaging-side coupling device into the engaged state when the input speed has been raised to a predetermined value, and further such that when the switching from the forward driving of the vehicle to its reverse driving is required in the process of the coasting shift-down action, the transmission shifting control portion controls the engaging-side coupling device to be brought into the engaged state, by implementing a compensation control to raise an engaging pressure of the engaging-side coupling device to raise the input speed of the automatic transmission toward the synchronizing speed of the forward-drive low-speed gear position.

According to a seventh mode of the invention, the control apparatus according to the first mode of the invention is configured such that the state of control of the engaging-side coupling device is represented by a kind of control to establish the forward-drive low-speed gear position, and such that when a manual shift-down action of the automatic transmission to the forward-drive low-speed gear position is implemented as a result of an operation of a manually operated shifting member by an operator of the vehicle, the transmission shifting control portion controls the engaging-side coupling device to be brought into the engaged state, by raising an engaging pressure of the engaging-side coupling device to raise an input speed of the automatic transmission toward a synchronizing speed of the forward-drive low-speed gear position, and further such that when the switching from the forward driving of the vehicle to its reverse driving is required in the process of the manual shift-down action, the transmission shifting control portion implements a compensation control to raise an engaging pressure of the engaging-side coupling device.

According to an eighth mode of the invention, the control apparatus according to any one of the first through seventh modes of the invention is configured such that the transmission shifting control portion implements the control for promotion to establish the forward-drive low-speed gear position of the automatic transmission, by limiting the reverse driving torque generated by the motor/generator.

According to a ninth mode of the invention, the control apparatus according to any one of the first through eighth modes of the invention is applicable to the vehicle further provided with an engine also functioning as the drive power source, and an electrically controlled transmission mechanism which has a differential mechanism operatively connected to the engine in a power transmittable manner, and a first motor/generator operatively connected to the differential mechanism in a power transmittable manner. A differential state of the differential mechanism is controlled according to an operating state of the first motor/generator. The above-described motor/generator is a second motor/generator operatively connected to an output rotary member of the electrically controlled transmission mechanism in a power transmittable manner.

According to the first mode of the invention, the control for promotion to establish the forward-drive low-speed gear position of the automatic transmission is implemented according to the state of control of the engaging-side coupling device to be brought into its engaged state, when the switching from the forward driving of the vehicle to its reverse driving is required in the process of the shifting action of the automatic transmission to the forward-drive low-speed gear position, so that the forward-drive low-speed gear position can be easily established. Accordingly, it is possible to reduce the risk of delay of generation of a reverse drive force by the motor/generator when the reverse driving of the vehicle is required in the process of the shifting action of the automatic transmission to the forward-drive low-speed gear position. Further, the control for promotion to establish the forward-drive low-speed gear position is implemented according to the state of control of the engaging-side coupling device, so that a risk of excessive promotion to establish the forward-drive low-speed gear position can be reduced, whereby a risk of generation of a shifting shock of the automatic transmission can be accordingly reduced.

According to the second mode of the invention wherein the transmission shifting control portion implements the control for promotion to establish the forward-drive low-speed gear position, by implementing the compensation control to raise the engaging pressure of the engaging-side coupling device, the forward-drive low-speed gear position can be easily established.

According to the third mode of the invention, the amount of rise of the engaging pressure of the engaging-side coupling device by the compensation control is increased with the decrease of the engaging pressure at the moment at which the switching to the reverse driving of the vehicle is required. Accordingly, the forward-drive low-speed gear position can be easily established, and the risk of generation of the shifting shock of the automatic transmission due to an excessively large amount of compensation of the engaging pressure can be reduced.

According to the fourth mode of the invention, the amount of compensation to raise the engaging pressure of the engaging-side coupling device is changed according to the king of control to establish the forward-drive low-speed gear position, and the control for promotion to establish the forward-drive low-speed gear position is implemented according to the kind of control to establish the forward-drive low-speed gear position. Accordingly, the forward-drive low-speed gear position can be easily established, and the risk of generation of the shifting shock due to an excessive amount of compensation of the engaging pressure of the engaging-side coupling device can be reduced.

According to the fifth mode of the invention, when the coasting shift-down action of the automatic transmission to the forward-drive low-speed gear position is implemented, the transmission shifting control portion determines the amount of compensation to raise the engaging pressure of the engaging-side coupling device such that the amount of compensation is larger when the coasting shift-down action is implemented than when the manual shift-down action is implemented. Thus, the control for promotion to establish the forward-drive low-speed gear position is suitably implemented depending upon whether the shift-down action to the forward-drive low-speed gear position is the coasting shift-down action or the manual shift-down action. Accordingly, the forward-drive low-speed gear position in both of the coasting shift-down action and the manual shift-down action can be easily established, while the risk of generation of the engaging shock of the automatic transmission due to an excessively large amount of compensation to raise the engaging pressure of the engaging-side coupling device can be suitably reduced.

According to the sixth mode of the invention, when the switching from the forward driving of the vehicle to its reverse driving is required in the process of the coasting shift-down action, the transmission shifting control portion controls the engaging-side coupling device to be brought into the engaged state, by implementing a compensation control to raise an engaging pressure of the engaging-side coupling device to raise the input speed of the automatic transmission toward the synchronizing speed of the forward-drive low-speed gear position. Accordingly, the coasting shift-down action of the automatic transmission can progress even if the rise of the input speed toward the synchronizing speed by a temporary increase of the forward driving torque generated by the motor/generator so as to be larger than the required value is interrupted by the requirement for switching from the forward driving of the vehicle to its reverse driving. Thus, it is possible to reduce the risk of delay of generation of the reverse drive force due to the requirement for switching to the reverse driving of the vehicle in the process of the coasting shift-down action of the automatic transmission.

According to the seventh mode of the invention, when the switching from the forward driving of the vehicle to its reverse driving is required in the process of the manual shift-down action, the transmission shifting control portion implements a compensation control to raise an engaging pressure of the engaging-side coupling device, so that the manual shift-down action can easily progress. Thus, it is possible to reduce the risk of delay of generation of the reverse drive force due to the requirement for switching to the reverse driving of the vehicle in the process of the manual shift-down action of the automatic transmission.

According to the eighth mode of the invention, the transmission shifting control portion implements the control for promotion to establish the forward-drive low-speed gear position of the automatic transmission, by limiting the reverse driving torque generated by the motor/generator. Accordingly, the difficulty of the input speed of the automatic transmission to approach the synchronizing speed of the forward-drive low-speed gear position is reduced, so that the forward-drive low-speed gear position can be easily established.

According to the ninth mode of the invention applicable to the vehicle provided with the electrically controlled transmission mechanism and the mechanically operated transmission mechanism in the form of the automatic transmission which are connected in series with each other, the risk of delay of generation of the reverse driving force can be reduced when the switching to the reverse driving of the vehicle is required in the process of the shifting action of the transmission mechanism to the forward-drive low-speed gear position.

DETAILED DESCRIPTION OF INVENTION

Figure 1:
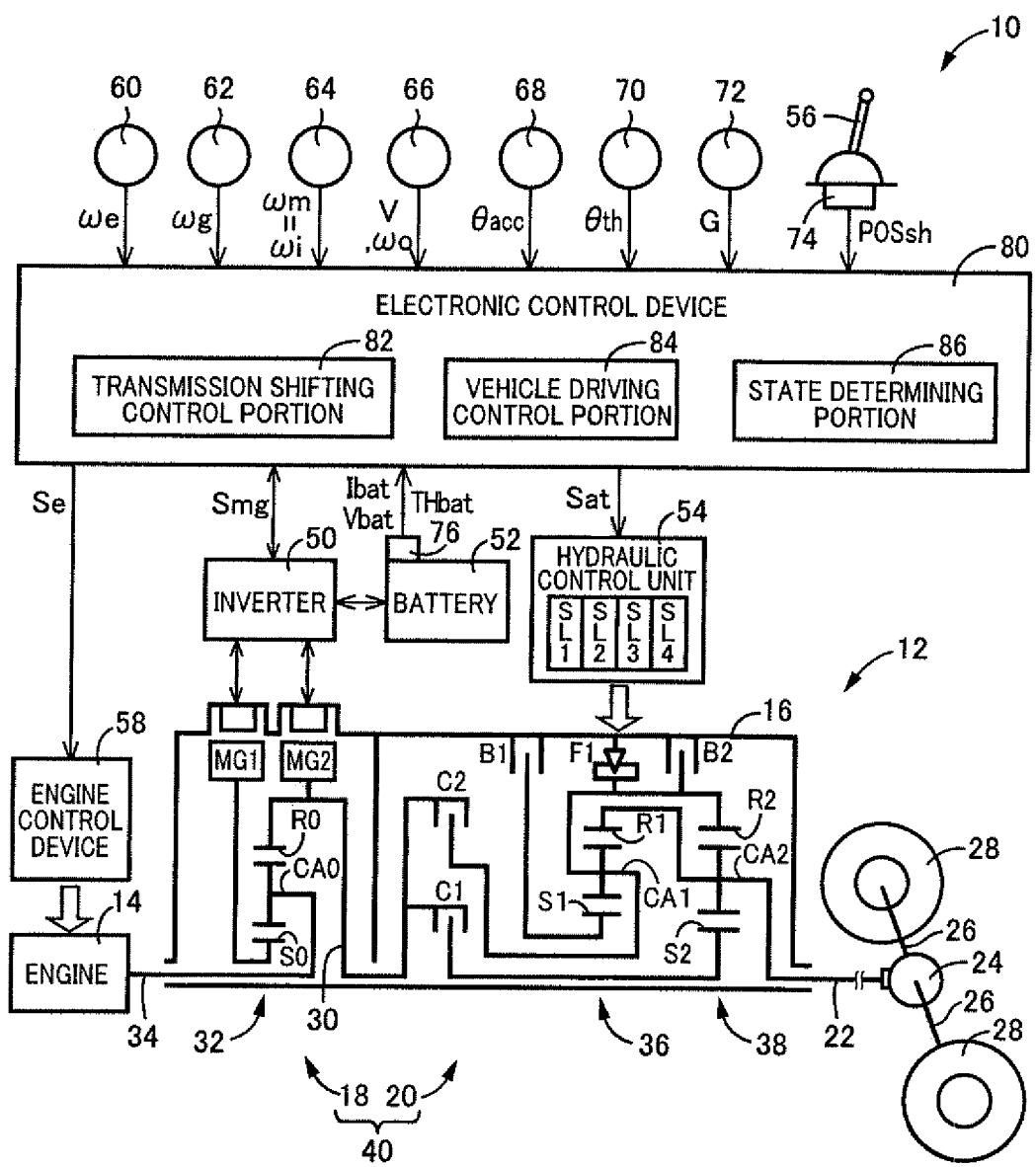
FIG. 1 is a schematic view showing an arrangement of a vehicular drive system to be controlled by a control apparatus according to the present invention, and major control functions and control portions of the control apparatus.

Referring to the drawings, preferred embodiments of the present invention will be described in detail.

First Embodiment

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 functioning as a drive power source, an electrically controlled continuously variable transmission portion 18 (hereinafter referred to as "continuously variable transmission portion 18") connected directly or indirectly via a damper (not shown) or any other device to the engine 14, and a mechanically operated step-variable transmission portion 20 (hereinafter referred to as "step-variable transmission portion 20") connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a non-rotatable member fixed to a vehicle body, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te, which is an output torque of this engine 14, is controlled by an electronic control device 80 (described below) which controls the operating condition of the engine 14 as represented by an opening angle θth of a throttle valve or an intake air quantity, an amount of injection of a fuel and an ignition timing. In the present embodiment, the engine 14 is connected to the continuously variable transmission portion 18, without a fluid-operated type power transmitting device such as a torque converter or a fluid coupling being disposed between the engine 14 and the transmission portion 18.

The continuously variable transmission portion 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission portion 18; and the second motor/generator MG2 operatively connected to the intermediate power transmitting member 30. The continuously variable transmission portion 18 is an electrically controlled continuously variable transmission wherein a differential state of the differential mechanism 32 is controllable by controlling an operating state of the first motor/generator MG1. The first motor/generator MG1 functions as a differential motor/generator (a differential motor) while the second motor/generator MG2 is a motor/generator (an electric motor) which functions as a drive power source, namely, a vehicle driving motor/generator. The vehicle 10 is a hybrid vehicle provided with the drive power source in the form of the engine 14 and the second motor/generator MG2.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a mechanically operated transmission mechanism which constitutes a part of a power transmitting path between the intermediate power transmitting member 30 and the drive wheels 28. The intermediate power transmitting member 30 also functions as an input rotary member of the step-variable transmission portion 20. The step-variable transmission portion 20 is considered to also constitute a part of a power transmitting path between the drive power source (second motor/generator MG2 or engine 14) and the drive wheels 28, since the second motor/generator MG2 is connected to the intermediate power transmitting member 30 such that the intermediate power transmitting member 30 is rotated together with the second motor/generator MG2, or since the engine 14 is connected to an input rotary member of the continuously variable transmission portion 18. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified).

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipping or released states with their torque capacities (engaging torque values or CB-transmitted torque values) Tcb being changed according to engaging hydraulic pressures PRcb applied thereto, which are regulated by respective solenoid-operated valves SL1-SL4 incorporated within a hydraulic control unit 54. In order for each coupling device CB to be able to transmit a torque (for example, an AT input torque Ti which is an input torque of the step-variable transmission portion 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (CB-transmitted torque) to be transmitted through an engaging action of the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. It is noted that the engaging torque (CB-transmitted torque) Tcb and the engaging hydraulic pressure PRcb are proportional to each other, after the engaging hydraulic pressure PRcb has been raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission portion 20 is a step-variable automatic transmission which is shifted to a selected one of four AT gear positions (speed positions) by engaging actions of selected ones of the coupling devices CB. These four AT gear positions have respective different speed ratios γat (=AT input speed ωi/AT output speed ωo). Namely, the step-variable transmission portion 20 is a step-variable transmission which is shifted up and down from one gear position to another by placing selected ones of the coupling devices CB in the engaged state. The AT input speed ωi is a rotating speed (angular velocity) of the input rotary member of the step-variable transmission portion 20, that is, a rotating speed of the intermediate power transmitting member 30, which is equal to an MG2 speed ωm which is an operating speed of the second motor/generator MG2. Thus, the AT input speed ωi can be represented by the MG2 speed ωm. The AT output speed ωo is a rotating speed of the output shaft 22 of the step-variable transmission portion 20, which is considered to be an output speed of a transmission device 40 which consists of the continuously variable transmission portion 18 and the step-variable transmission portion 20.

Figures 2, 3:
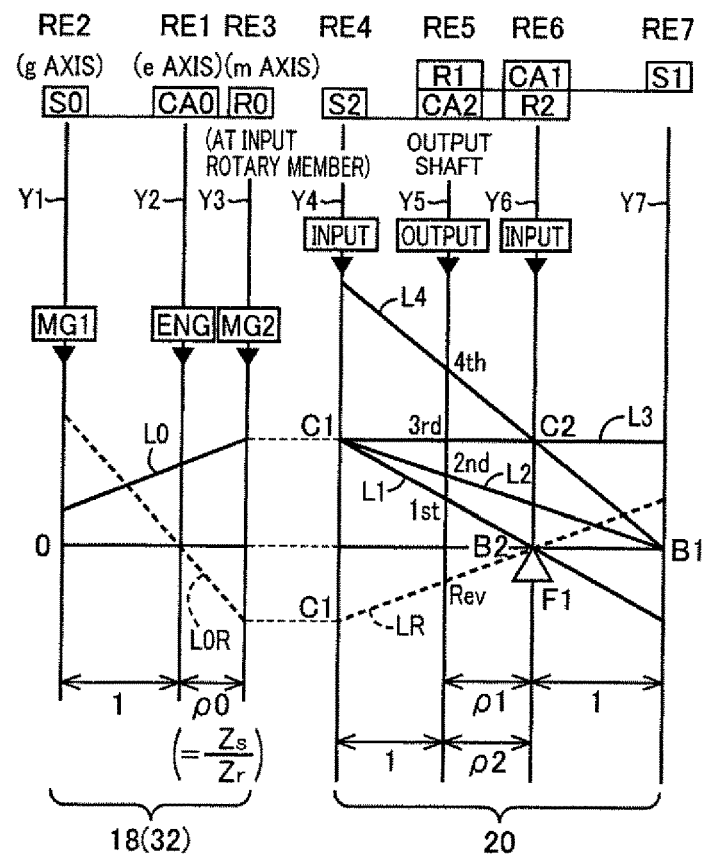
FIG. 2 is a table indicating a relationship between gear positions of a mechanically operated step-variable transmission portion shown in FIG. 1 and combinations of coupling devices placed in engaged states to establish the respective gear positions.
FIG. 3 is a collinear chart indicating a relationship among rotating speeds of rotary elements of an electrically controlled continuously variable transmission portion and the mechanically operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward drive AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed AT gear position (lowest-speed gear position) "$1^{st}$" toward the fourth speed AT gear position (highest-speed gear position) "$4^{th}$". In the table, "O" indicates the engaged state of the coupling devices CB, "Δ" indicates the engaged state of the coupling device B2 during application of an engine brake to the vehicle 10 or during a shift-down action of the step-variable transmission portion 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "$1^{st}$", so that the brake B2 is not required to be placed in the engaged state upon starting or acceleration of the vehicle 10. The above-indicated shift-down action of the step-variable transmission portion 20 in the coasting run of the vehicle 10 is a kind of a "power-off shift-down action" which is required as a result of reduction of a vehicle-speed-related value (vehicle running speed V, for example) due to reduction of a required drive force (as represented by an operation amount θacc of an accelerator pedal by a driver (operator) of the vehicle 10) or during deceleration of the vehicle 10 in a released position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission portion 20 is placed in a neutral position (a power transmission cutoff state) when all of the coupling devices CB are placed in the released states.

The step-variable transmission portion 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80, more specifically, by a transmission shifting control portion 82 configured to control shifting actions of the step-variable transmission portion 20 as described below. The above-indicated one coupling device CB (releasing-side coupling device CB) was placed in the engaged state before the step-variable transmission portion 20 is shifted to establish the newly selected AT gear position, while the above-indicated another coupling device CB (engaging-side coupling device CB) is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, concurrent releasing and engaging actions of the selected two coupling devices CB. For instance, the step-variable transmission portion 20 is shifted down from the second speed AT gear position "$2^{nd}$" to the first speed AT gear position "$1^{st}$", with the releasing action of the brake B1 (releasing-side coupling device CB) and the concurrent engaging action of the brake B2 (engaging-side coupling device CB), as indicated in the table of FIG. 2. In this instance, the hydraulic pressures applied to the brakes B1 and B2 are transiently controlled to bring these brakes B1 and B2 into the released and engaged states, respectively. The releasing-side coupling device CB is the coupling device which is brought into its released state to implement the shifting action of the step-variable transmission portion 20, while the engaging-side coupling device CB is the coupling device which is brought into its engaged state to implement the shifting action.

The collinear chart of FIG. 3 indicates a relationship among rotating speeds of the rotary elements of the continuously variable transmission portion 18 and the step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio $\rho 0$ of the differential mechanism 32, while the distances between the adjacent ones of the vertical lines Y4-Y7 are determined by gear ratios $\rho 1$ and $\rho 2$ of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio $\rho$ of the planetary gear set (=number of teeth Zs of the sun gear/number of teeth Zr of the ring gear).

Referring to the collinear chart of FIG. 3, the differential mechanism 32 of the continuously variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the continuously variable transmission portion 18, straight lines L0 and L0R intersecting the vertical line Y2 represent a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission portion 20, straight lines L1, L2, L3, L4 and LR intersecting the vertical line Y5 represent the rotating speeds of the output shaft 22 in the respective first, second, third, fourth speed AT gear positions "$1^{st}$", "$2^{nd}$", "$3^{rd}$", "$4^{th}$" and reverse drive gear position "Rev" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque which is a negative torque generated by the first motor/generator MG1 operated in the positive direction is applied to the sun gear S0, a directly transmitted engine torque Td (=Te/(1+$\rho 0$)=$-(1/\rho 0)*$Tg) which is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to required vehicle drive force. At this time, the first motor/generator MG1 functions as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely operated in the negative direction. Namely, in the motor drive mode, the engine 14 is held in a non-operated state, so that an operating speed we of the engine 14 (engine speed $\omega e$) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions.

Broken straight lines L0R and LR shown in the collinear chart of FIG. 3 indicate the relative rotating speeds of the rotary elements in a motor drive mode in which the vehicle 10 is driven in the rearward direction. During driving of the vehicle 10 in the rearward direction in this motor drive mode, the MG2 torque Tm which is a negative torque generated by the second motor/generator MG2 operated in the negative direction is applied to the ring gear R0, and is transmitted to the drive wheels 28 as a drive torque to drive the vehicle 10 in the rearward direction, through the step-variable transmission portion 20 placed in the first speed AT gear position. Under the control of the electronic control device 80 (in particular, a vehicle driving control portion 84 for controlling driving state of the vehicle 10), the vehicle 10 can be driven in the rearward direction with the reverse driving MG2 torque Tm (MG2 torque TmR; negative vehicle driving torque) acting in the direction opposite to the direction of acting of the forward driving MG2 torque Tm (MG2 torque TmF; positive vehicle driving torque), while the step-variable transmission portion 20 is placed in a forward-drive low-speed gear position (e.g., first speed AT gear position) of the plurality of the AT gear positions (first through fourth speed AT gear positions). Thus, the vehicle 10 is driven in the rearward direction with the reverse (negative) MG2 torque Tm while the step-variable transmission portion 20 is placed in one of the forward-drive AT gear positions. The step-variable transmission portion 20 does not have a reverse-drive AT gear position in which the direction of the output rotary motion is reversed with respect to that of the input rotary motion. In the hybrid drive mode, too, the second motor/generator MG2 can be operated in the negative direction as indicated by the straight line L0R, so that the vehicle 10 can be driven in the rearward direction in the hybrid drive mode, as well as in the motor drive mode.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is connected (in other words, the second motor/generator MG2) is operatively connected. Namely, the continuously variable transmission portion 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously variable transmission portion 18 is operated as an electrically controlled continuously variable transmission a speed ratio $\gamma 0$ ($=\omega e/\omega m$) of which is variable. The speed ratio $\gamma 0$ is a ratio of a rotating speed of the connecting shaft 34 (namely, engine speed $\omega e$) to the rotating speed of the intermediate power transmitting member 30 (namely, MG2 speed $\omega m$).

In the hybrid drive mode, for instance, the rotating speed of the sun gear S0 is raised or lowered by controlling an operating speed of the first motor/generator MG1 while the rotating speed of the ring gear R0 is determined by the rotating speed of the drive wheels 28 with the step-variable transmission portion 20 placed in one of the AT gear positions, so that the rotating speed of the carrier CA0 (namely, engine speed $\omega e$) is accordingly raised or lowered. In running with operation of the engine 14, therefore, the engine 14 can be operated at an efficient operating point. That is, the step-variable transmission portion 20 to be placed in a selected one of the AT gear positions and the continuously variable transmission portion 18 functioning as a continuously variable transmission cooperate to provide the transmission device 40 in which the continuously variable transmission portion 18 (differential mechanism 32) and the step-variable transmission portion 20 are disposed in series with each other and which functions as a continuously variable transmission as a whole.

Alternatively, the continuously variable transmission portion 18 can be shifted like a step-variable transmission. Accordingly, the transmission device 40 constituted by the step-variable transmission portion 20 to be placed in one of the AT gear positions and the continuously variable transmission portion 18 which can be shifted like the step-variable transmission can be shifted like a step-variable transmission as a whole. That is, the step-variable transmission portion 20 and the continuously variable transmission portion 18 can be controlled to selectively establish a plurality of speed positions (hereinafter referred to as "overall speed positions" although it may be referred also to as "conceptual speed positions") having respective different values of a speed ratio $\gamma t$ ($=\omega e/\omega o$) which is a ratio of the engine speed $\omega e$ to the output speed $\omega o$. The speed ratio $\gamma t$ is an overall speed ratio of the transmission device 40 consisting of the continuously variable transmission portion 18 and the step-variable transmission portion 20 which are disposed in series with each other. The overall speed ratio $\gamma t$ is equal to a product of the speed ratio $\gamma 0$ of the continuously variable transmission portion 18 and the speed ratio $\gamma at$ of the step-variable transmission portion 20, namely, $\gamma t=\gamma 0 * \gamma at$.

Figures 4, 5:
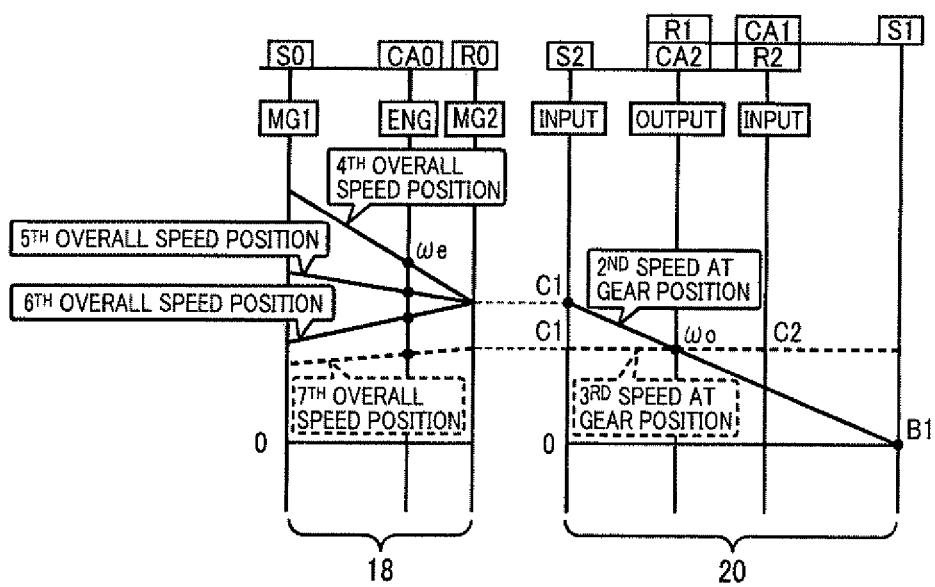
FIG. 4 is a table indicating an example of a plurality of overall speed positions of a transmission device in relation to the gear positions of the step-variable transmission portion.
FIG. 5 is a view indicating some examples of the gear positions of the step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different speed ratio values $\gamma 0$ of the continuously variable transmission portion 18. FIG. 4 is the table indicating an example of the overall speed positions of the transmission device 40, wherein the first through third overall speed positions are established for the first speed AT gear position, the fourth through sixth overall speed positions are established for the second speed AT gear position, the seventh through ninth overall speed positions are established for the third speed AT gear position, and the tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously variable transmission portion 18 is controlled to control the engine speed ωe with respect to the output speed ωo for establishing the predetermined overall speed ratio values γt, to thereby establish the different overall speed position or positions for each of the AT gear positions. A broken line indicates the seventh overall speed position established when the step-variable transmission portion 20 is placed in the third speed AT gear position. In the transmission device 40, the continuously variable transmission portion 18 is controlled according to the selected one of the AT gear positions, for shifting the transmission device 40 from one of the overall speed positions to another.

Referring back to FIG. 1, the vehicle 10 is provided with the control apparatus in the form of the electronic control device 80 configured to control various devices of the vehicle 10 such as the engine 14, continuously variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals from various sensors provided on the vehicle 10, such as: an output signal of an engine speed sensor 60 indicative of the engine speed ωe; an output signal of an MG1 speed sensor 62 indicative of the MG1 speed ωg which is the operating speed of the first motor/generator MG1; an output signal of an MG2 speed sensor 64 indicative of the MG2 speed ωm which is the AT input speed ωi; an output signal of an output speed sensor 66 indicative of the output speed ωo corresponding to the vehicle running speed V; an output signal of an accelerator pedal operation amount sensor 68 indicative of the operation amount θacc of a vehicle accelerating member in the form of the accelerator pedal, which operation amount θacc represents a degree of acceleration of the vehicle 10 required by the vehicle operator; an output signal of a throttle valve opening angle sensor 70 indicative of an angle θth of opening of an electronic throttle valve; an output signal of an acceleration sensor 72 indicative of a longitudinal acceleration value G of the vehicle 10; an output signal of a shift position sensor 74 indicative of a presently selected one of operating positions POSsh of a manually operated shifting member in the form of a shift lever 56 provided on the vehicle 10; and an output signal of a battery sensor 76 indicative of a temperature THbat, a charging/discharging electric current Ibat and a voltage Vbat of the battery 52. Further, the electronic control device 80 generates various output signals to the various devices provided on the vehicle 10, such as: an engine control command signal Se to be applied to an engine control device 58 provided to control a throttle actuator, a fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54, for controlling the operating states of the coupling devices CB (namely, for controlling the shifting actions of the step-variable transmission portion 20). The hydraulic control command signals Sat are command signals for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current or voltage corresponding to the hydraulic pressure command value to the hydraulic control unit 54.

The operating positions POSsh of the shift lever 56 consist of: a parking position P; a reverse drive position R; a neutral position N; a forward drive position D; and a manual shifting position M, for example. The parking position P is a position which is established to place the transmission device 40 in a neutral state (in which the step-variable transmission portion 20 is placed in a non-power transmittable state with all of the coupling devices CB placed in their released state) and in which the output shaft 22 is mechanically locked to prevent its rotary motion, for thereby holding the transmission device 40 in a parking brake position. The reverse drive position R is a position in which the transmission device 40 is placed in a rear drive state in which the vehicle 10 can be driven in the rearward direction with the MG2 torque TmR while the step-variable transmission portion 20 is placed in the first speed AT gear position. The neutral position N is a position in which the transmission device 40 is placed in the above-indicated neutral state. The forward drive position D is a position in which the transmission device 40 is placed in a forward drive state in which the vehicle 10 can be driven in the forward direction according to an automatic shifting control to selectively establish one of all of the first through tenth overall speed positions. When the presently selected operating position POSsh is the forward drive position D, the transmission device 40 is placed in an automatic shifting mode in which the transmission device 40 is automatically shifted according to a shifting map (an overall speed position shifting map described below, for example). The manual shifting position M is a position in which the transmission device 40 can be shifted to a selected one of the overall speed positions according to a manual shifting operation by the vehicle operator. For instance, the manual shifting operation is an operation of the shift lever 56 from the manual shifting position M to one of a shift-up position and a shift-down position located on respective opposite sides of the manual shifting position M, and/or an operation of a paddle switch which is disposed on a steering wheel and which has a shift-up switch and a shift-down switch. When the presently selected operating position POSsh is the manual shifting position M, the transmission device 40 is placed in a manual shifting mode in which the transmission device 40 can be shifted according to the manual operation by the vehicle operator. Where the vehicle 10 is provided with the paddle switch, the transmission device 40 can be shifted to a selected one of the overall speed positions in the manual shifting mode according to an operation of the paddle switch, even while the presently selected operating position POSsh is the forward drive position D.

When the shift lever 56 is operated from the forward drive position D to the reverse drive position R, the transmission device 40 is required to be switched from the forward drive state to the reverse drive state, namely, the switching from forward driving of the vehicle 10 to its reverse driving is required. Thus, the shift lever 56 functions as a manually operable member for manually switching the transmission device 40 between its forward drive state and the reverse drive state.

The electronic control device 80 is configured to calculate a charging state (stored electric power amount) SOC (%) of the battery 52 on the basis of the charging/discharging electric current Ibat and the voltage Vbat of the battery 52. The electronic control device 80 is further configured to calculate, on the basis of, for example, the temperature THbat and the charging state SOC of the battery 52, a maximum charging amount Win of electric power that can be stored in the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric energy amount SOC is relatively small.

To implement various controls of the vehicle 10, the electronic control device 80 includes transmission shifting control means in the form of the transmission shifting control portion 82, and vehicle driving control means in the form of the vehicle driving control portion 84 indicated above.

The transmission shifting control portion 82 is configured to determine a shifting action of the step-variable transmission portion 20 according to a memory-stored AT gear position shifting map obtained by experimentation or determined by an appropriate theoretical analysis, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above represents a predetermined relationship between two variables in the form of the output speed $\omega o$ (equivalent to the vehicle running speed V) and the accelerator pedal operation amount $\theta acc$ (equivalent to a required drive torque Tdem or the throttle valve opening angle $\theta th$), which relationship is used to determine a shifting action of the step-variable transmission portion 20 and is represented by shift-up and shift-down shifting lines in a two-dimensional coordinate system in which the output speed $\omega o$ and the accelerator pedal operation amount $\theta acc$ are taken along respective two axes. The shifting lines in the AT gear position shifting map consist of the shift-up lines for determining a shift-up action of the step-variable transmission portion 20, and the shift-down lines for determining a shift-down action of the step-variable transmission portion 20. Each of the shifting lines is defined by a series of shifting points which are determined such that the step-variable transmission portion 20 should be shifted up or down when the output speed $\omega o$ becomes higher or lower than the shifting point at a given value of the accelerator pedal operation amount $\theta acc$, or when the accelerator pedal operation amount $\theta acc$ becomes larger or smaller than the shifting point at a given value of the output speed $\omega o$.

The vehicle driving control portion 84 has a function of an engine control means or portion to control the engine 14, and a function of a motor/generator control means or portion to control the first motor/generator MG1 and the second motor/generator MG2 through the inverter 50. Thus, the vehicle driving control portion 84 performs hybrid drive controls for controlling the engine 14, first motor/generator MG1 and second motor/generator MG2. The vehicle driving control portion 84 is configured to calculate a required vehicle drive power Pdem on the basis of the accelerator pedal operation amount $\theta acc$ and the vehicle running speed V, and according to a predetermined relationship in the form of a drive force map, for instance. In other words, the vehicle driving control portion 84 calculates the required drive torque Tdem at the present vehicle running speed V. The vehicle driving control portion 84 generates the engine control command signal Se to control the engine 14, and the motor/generator control command signals Smg to control the first motor/generator MG1 and the second motor/generator MG2, for establishing the required vehicle drive power Pdem, while taking account of the maximum charging and discharging amounts Win and Wout of electric power of the battery 52. For example, the engine control command signal Se represents a command value of an engine power Pe which is a power of the engine 14 outputting the torque Te at its present operating speed $\omega e$. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed $\omega g$, and an electric power amount Wm to be consumed by the second motor/generator MG2 to generate the MG2 torque Tm at the present MG2 speed $\omega m$.

When the transmission device 40 as a whole is operated as the continuously variable transmission while the continuously variable transmission portion 18 is operated as the continuously variable transmission, for instance, the vehicle driving control portion 84 controls the engine 14 and the electric power amount Wg to be generated by the first motor/generator MG1, so as to establish the engine speed $\omega e$ and the engine torque Te for obtaining the engine power Pe to establish the required vehicle drive power Pdem, while taking account of a highest fuel economy point of the engine 14, so that the speed ratio $\gamma 0$ of the continuously variable transmission portion 18 is controlled so as to be continuously varied. As a result, the speed ratio $\gamma t$ of the transmission device 40 is controlled while the continuously variable transmission portion 18 is operated as the continuously variable transmission.

When the transmission device 40 as a whole is operated as the step-variable transmission while the continuously variable transmission portion 18 is operated as the step-variable transmission, for instance, the vehicle driving control portion 84 determines a shifting action of the transmission device 40 according to an overall speed position shifting map, for example, and performs a shifting control of the continuously variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first motor/generator MG1 to control the engine speed $\omega e$ according to the output speed $\omega o$ so as to maintain the respective speed ratio values γt. The speed ratio γt in each of the overall speed positions does not necessarily have to be constant over all ranges of the output speed ωo, but may be changed in a predetermined range or ranges of the output speed ωo or may be given a limitation or limitations, for example, depending on upper and lower limits of rotating speeds of respective rotatable elements. In the manual shifting mode, the vehicle driving control portion 84 implements a shifting control of the continuously variable transmission portion 18 in cooperation with a shifting control of the step-variable transmission portion 20 by the transmission shifting control portion 82 to establish one of its AT gear positions, so as to establish one of the overall speed positions according to a manual operation of the shift lever 56 by the vehicle operator.

Figure 6:
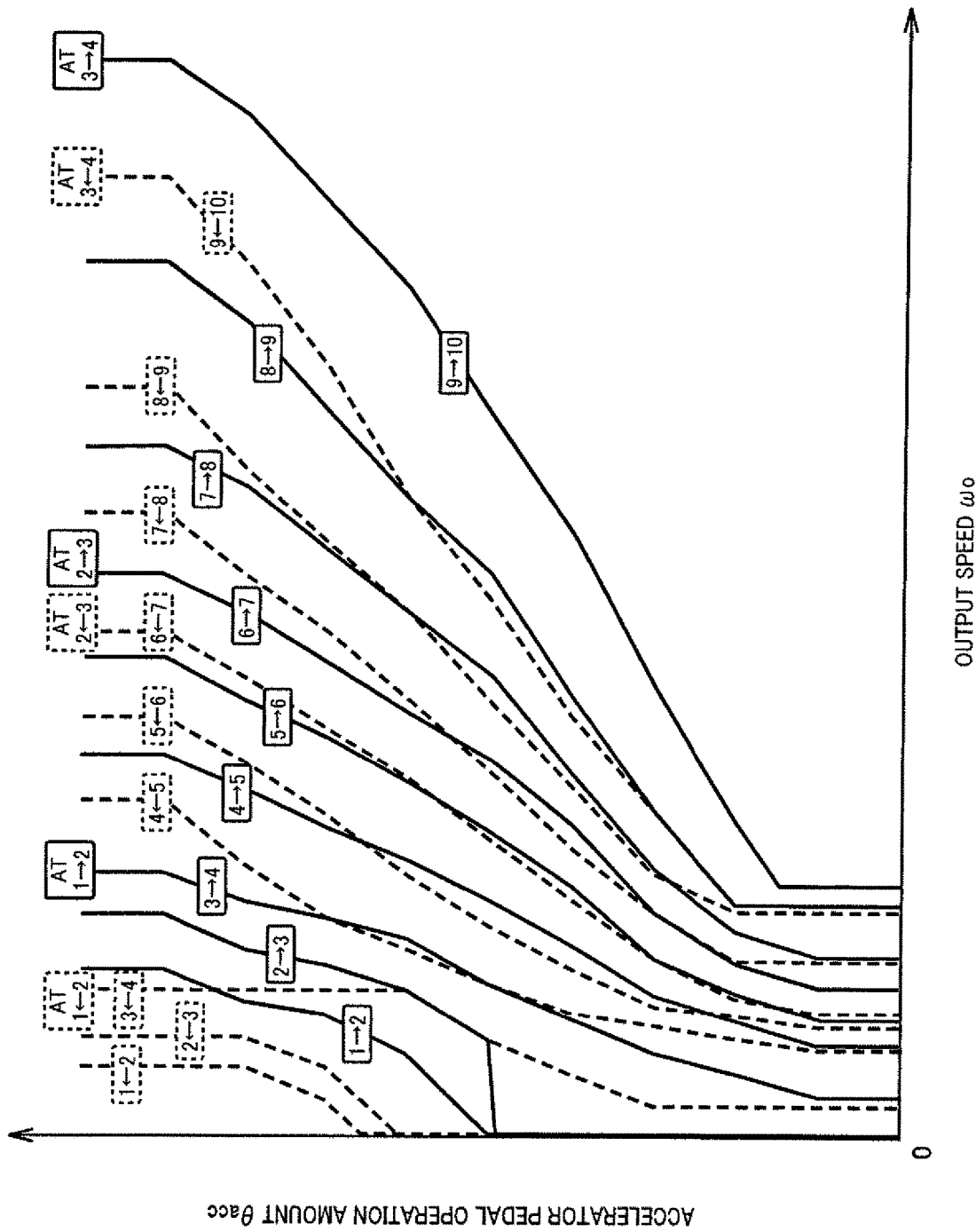
FIG. 6 is a view illustrating an example of an overall speed position shifting map used to shift the transmission device to a selected one of the plurality of overall speed positions.

Like the AT gear position shifting map, the above-indicated overall speed position shifting map is a relationship between the output speed ωo and the accelerator pedal operation amount θacc as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the vehicle driving control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission portion 20 is shifted between the second speed AT gear position and the first speed AT gear position. When the transmission device 40 is shifted between the seventh overall speed position and the sixth overall speed position, the step-variable transmission portion 20 is shifted between the third speed AT gear position and the second speed AT gear position. When the transmission device 40 is shifted between the tenth overall speed position and the ninth overall speed position, the step-variable transmission portion 20 is shifted between the fourth speed AT gear position and the third speed AT gear position. In this respect, reference is made to FIG. 4. Therefore, the AT gear position shifting map is formulated so that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed ωe, so that the vehicle operator is less likely to uncomfortably recognize a shifting shock of the step-variable transmission portion 20.

The vehicle driving control portion 84 selectively establishes the motor drive mode or the hybrid drive mode, depending upon a running state of the vehicle 10. For example, the vehicle driving control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the vehicle driving control portion 84 selects the hybrid drive mode if the electric power amount SOC stored in the battery 52 is smaller than a predetermined threshold value.

When the shift lever 56 is placed in the reverse drive position R, the vehicle driving control portion 84 commands the second motor/generator MG2 to be operated in a negative direction (opposite to a positive direction for forward driving of the vehicle) to generate the reverse driving MG2 torque TmR according to the accelerator pedal operation amount θacc, while the step-variable transmission portion 20 is placed in the first speed AT gear position in order to execute reverse driving.

When the shift lever 56 is placed in the neutral position N, the vehicle driving control portion 84 commands the transmission device 40 in its neutral state. The transmission device 40 is placed in its neutral state when the continuously variable transmission portion 18 is placed in its neutral state, and/or when the step-variable transmission portion 20 is placed in its neutral state (which may be referred to as "AT neutral state"). For instance, the vehicle driving control portion 84 commands the continuously variable transmission portion 18 to be brought into its neutral state, for placing the transmission device 40 to be placed in the neutral state. In this case, the vehicle driving control portion 84 generates the motor/generator control command signals Smg for holding both of the first motor/generator MG1 and the second motor/generator MG2 in their non-load states, to thereby place the continuously variable transmission portion 18 into the neutral state. Alternatively, the vehicle driving control portion 84 commands the transmission shifting control portion 82 to place the step-variable transmission portion 20 in its neutral state, for placing the transmission device 40 in the neutral state. In this case, the transmission shifting control portion 82 generates the hydraulic control command signals Sat for placing all of the coupling devices CB in their released states, to thereby place the step-variable transmission portion 20 into the neutral state. The step-variable transmission portion 20 is placed in the mechanically neutral state, while the continuously variable transmission portion 18 is placed in the electrically neutral state. Although the step-variable transmission portion 20 is placed in the neutral state by placing all of the coupling devices CB in the released states, the step-variable transmission portion 20 which is placed in one of the AT gear positions may be placed in the neutral state by bringing one of the coupling devices CB placed in the engaged states, into the released state.

The vehicle driving control portion 84 can place the transmission device 40 in the neutral state, irrespective of the presently selected operating position POSsh of the shift lever 56. For example, the vehicle driving control portion 84 commands the transmission device 40 in the neutral state when a predetermined condition is satisfied, for instance, when the accelerator pedal is placed in its non-operated position while the vehicle 10 is running or held at rest with the shift lever 56 being placed in the forward drive position D. When the step-variable transmission portion 20 is placed in the first speed AT gear position, for example, the transmission shifting control portion 82 may place the step-variable transmission portion 20 in the neutral position, by generating the hydraulic control command signal Sat for bringing one of the clutch C1 and the brake B2 into the released state. When the predetermined condition has become unsatisfied, the transmission shifting control portion 82 generates the hydraulic control command signal Sat for an engaging action of the coupling device CB (clutch C1 or brake B2) which has been brought into the released state for placing the step-variable transmission portion 20 in the neutral state, so that the step-variable transmission portion 20 is shifted back to the first speed AT gear position. Although this shifting of the step-variable transmission portion 20 to the first speed AT gear position is not a normal shifting action implemented under the control of the transmission shifting control portion 82, the coupling device CB brought back into the engaged state is also considered to be the engaging-side coupling device CB.

There will be described various modes of control to establish the first speed AT gear position of the step-variable transmission portion 20 which is used for the reverse driving of the vehicle 10 as well as for the forward driving of the vehicle 10. These modes of control include: a shifting control for shifting down the step-variable transmission portion 20 from the second speed AT gear position to the first speed AT gear position as low speed gear position, (hereinafter referred to as "2→1 shift-down action"), in particular, a 2→1 coasting shift-down action required in a decelerating state of the vehicle 10 while the accelerator pedal is placed in the non-operated position; a shifting control for manually shifting down the step-variable transmission portion 20 to the first speed AT gear position from a given higher-speed AT gear position as low speed gear position, (hereinafter referred to as "*→1 manual shift-down action") according to a manual operation of the shift lever 56 by the vehicle operator; and a shifting control for bringing the step-variable transmission portion 20 to the first speed AT gear position back from the neutral state, after the step-variable transmission portion 20 is once placed in the neutral state when the first speed AT gear position is established.

Where the accelerator pedal is placed in the non-operated position in the process of a shifting action of the step-variable transmission portion 20 to establish the first speed AT gear position, the AT input speed ωi cannot be raised to a synchronizing speed ωisyca (ωo*speed ratio γata of the first speed AT gear position) of the first speed AT gear position, when the engaging torque Tcb of the engaging-side coupling device CB to be brought into the engaged state to establish the first speed AT gear position is not generated. When the engaging torque Tcb of the engaging-side coupling device CB is generated, or when the AT input torque Ti is temporarily increased above the required value, the AT input speed ωi is raised toward the synchronizing speed ωisyca of the first speed AT gear position, permitting a progress of the shifting action of the step-variable transmission portion 20.

The present embodiment is arranged to adopt a control mode A as a normal mode of control to implement the 2→1 coasting shift-down action. In this control mode A, the 2→1 coasting shift-down action is implemented to progress by temporarily increasing the AT input torque Ti while both of the releasing-side coupling device CB (brake B1) and the engaging-side coupling device CB (brake B2) are placed in free states in which the engaging torque Tcb is not generated. Described more specifically, the transmission shifting control portion 82 implements the normal mode of control to implement the 2→1 coasting shift-down action, by commanding the vehicle driving control portion 84 to temporarily increase the forward driving MG2 torque TmF so as to be larger than the required value, in the process of the 2→1 coasting shift-down action, for thereby temporarily increasing the AT input torque Ti applied to the step-variable transmission portion 20, so that the AT input speed ωi is raised toward the post-shifting synchronizing speed ωisyca (namely, synchronizing speed ωisycl of the first speed AT gear position=ωo*speed ratio γat1 of the first speed AT gear position). When the AT input speed ωi has been raised to a predetermined value, the transmission shifting control portion 82 generates the hydraulic control command signal Sat so that the engaging-side coupling device CB (brake B2) which was held in the released state prior to the 2→1 coasting shift-down action is brought into its engaged state. The predetermined value of the AT input speed ωi is a predetermined threshold value above which a risk of generation of the shifting shock of the step-variable transmission portion 20 is considered to be reduced even if the engaging-side coupling device CB is abruptly brought into its engaged state. This threshold value is equal to the synchronizing speed ωisycl of the first speed AT gear position, or lower than and close to the synchronizing speed ωisycl. Thus, the transmission shifting control portion 82 is configured to temporarily increase the forward driving MG2 torque TmF so as to be larger than the required value so that the AT input torque Ti is temporarily increased to be larger than the required value. For example, this required value of the AT input torque Ti is a value obtained by conversion of the required drive torque Tdem into a torque value of the intermediate power transmitting member 30. Since the accelerator pedal operation amount θacc is almost zero during coasting shift-down, the required value of the AT input torque Ti may be almost equal to a value at which a so-called "creep torque" to permit a creeping motion of the vehicle 10 can be obtained, for instance. The required torque value is equivalent to a required output torque of the second motor/generator MG2 to achieve the required value of the AT input torque Ti.

The transmission shifting control portion 82 is also configured to establish a control mode B as a normal mode of control to implement the *→1 manual shift-down action. In this control mode B, the *→1 manual shift-down action is implemented to progress by generating the hydraulic control command signal Sat to control the engaging-side coupling device CB (brake B2) so as to generate the engaging torque Tcb. Described more specifically, the transmission shifting control portion 82 implements the normal mode of control to implement the *→1 manual shift-down action, by generating the hydraulic control command signal Sat to raise the engaging hydraulic pressure PRcb of the engaging-side coupling device CB (brake B2) which was held in the released state prior to the *→1 manual shift-down action, so that the AT input speed ωi is raised toward the synchronizing speed ωisycl of the first speed AT gear position, for bringing the engaging-side coupling device CB into the engaged state.

As a normal mode of control to implement a shifting action of the step-variable transmission portion 20 from the neutral state back to the first speed AT gear position, either one of the control mode A and the control mode B described above may be established. For example, the control mode A is established where it is desired to reduce the risk of generation of the shifting shock, while the control mode B is established where it is desired to improve a control response of the shifting action back to the first speed AT gear position.

By the way, the shift lever 56 may be operated to the reverse drive position R, namely, switching from the forward driving of the vehicle 10 to its reverse driving may be required, in the process of a shifting action of the step-variable transmission portion 20 to the first speed AT gear position. In this case, the reverse driving MG2 torque TmR is generated as a result of an operation of the shift lever 56 to the reverse drive position R (*→R operation of the shift lever 56), so that it is difficult for the AT input speed ωi to approach the synchronizing speed ωisycl of the first speed AT gear position, and it is therefore difficult to establish the first speed AT gear position, giving rise to a risk of delay of generation of the reverse drive force. Where the shift lever 56 is operated from the forward drive position D to the reverse drive position R, namely, where switching from the forward driving of the vehicle 10 to the reverse driving is required, in the process of the 2→1 coasting shift-down action, for example, both of the releasing-side and engaging-side coupling devices CB are placed in the free states in which the engaging torque Tcb is not generated. Accordingly, switching of the MG2 torque Tm from the forward driving MG2 torque TmF to the reverse driving MG2 torque TmR as a result of the D→R operation of the shift lever 56 gives rise to a risk of generation of an undershooting phenomenon of the AT input speed ωi, that is, a drop of the AT input speed ωi below a pre-shifting synchronizing speed ωisycb (=ωo*speed ratio γatb prior to the 2→1 coasting shift-down action). Accordingly, initiation of the inertia phase of the 2→1 coasting shift-down action is delayed, and the 2→1 coasting shift-down action does not progress. In view of this, a backup control of the engaging hydraulic pressure of the engaging-side coupling device CB is initiated to cause the engaging-side coupling device CB to generate the engaging torque Tcb for thereby permitting the coasting shift-down action to progress. As a result of generation of the engaging torque Tcb by the engaging-side coupling device CB, the AT input speed ωi is raised toward the post-shifting synchronizing speed ωisyca. However, there are a risk of dropping of the reverse drive torque and a risk of an engaging shock (synchronization shock) of the engaging-side coupling device CB. Thus, the 2→1 coasting shift-down action suffers from the risk of delay of its progress and the risk of delay of generation of the reverse drive force.

In view of the drawbacks described above, the transmission shifting control portion 82 is configured to implement a control for promotion to establish the first speed AT gear position of the step-variable transmission portion 20, when the switching from the forward driving of the vehicle 10 to its reverse driving is required in the process of a shifting action of the step-variable transmission portion 20 to the first speed AT gear position. The transmission shifting control portion 82 implements the control for promotion to establish the first speed AT gear position, according to a state of control of the engaging-side coupling device CB to be brought into its engaged state for establishing the first speed AT gear position.

It is possible to easily permit a progress of the shifting action of the step-variable transmission portion 20 to the first speed AT gear position, by controlling the engaging hydraulic pressure PRcb of the engaging-side coupling device CB in the process of the shifting action of the step-variable transmission portion 20, so as to be higher than the engaging hydraulic pressure PRcb in a normal control mode where the switching from the forward driving of the vehicle 10 to its reverse driving is not required. In this respect, the transmission shifting control portion 82 implements the control for promotion to establish the first speed AT gear position, by implementing a compensation control to raise the engaging hydraulic pressure PRcb of the engaging-side coupling device CB.

One parameter representative of the state of control of the engaging-side coupling device CB is the engaging hydraulic pressure PRcb of the engaging-side coupling device CB at a moment at which the switching to the reverse driving of the vehicle 10 is required. This engaging hydraulic pressure PRcb may be an actual value or a commanded value. The transmission shifting control portion 82 increases an amount of rise of the engaging hydraulic pressure PRcb of the engaging-side coupling device CB by the compensation control, with a decrease of the engaging hydraulic pressure PRcb at the moment at which the switching to the reverse driving of the vehicle 10 is required.

Alternatively, it is possible to easily permit the progress of the shifting action of the step-variable transmission portion 20 to the first speed AT gear position, by limiting the reverse driving MG2 torque TmR generated as a result of the *→R operation of the shift lever 56. Namely, the transmission shifting control portion 82 implements the control for promotion to establish the first speed AT gear position, by limiting the reverse driving MG2 torque TmR generated by the second motor/generator MG2 through the vehicle driving control portion 84. For instance, the transmission shifting control portion 82 limits the reverse driving MG2 torque TmR by inhibiting the second motor/generator MG2 from generating the reverse driving MG2 torque TmR. The transmission shifting control portion 82 may inhibit the second motor/generator MG2 from generating the reverse driving MG2 torque TmR, by zeroing the MG2 torque Tm generated by the second motor/generator MG2, or by commanding the second motor/generator MG2 to generate the forward driving MG2 torque TmF. In the latter case, the forward driving MG2 torque TmF is generated not for the purpose of promoting a rise of the AT input speed ωi, but for the purpose of preventing from difficulties in establishing the first speed AT gear position. Alternatively, the transmission shifting control portion 82 limits the reverse driving MG2 torque TmR generated by the second motor/generator MG2, by controlling the reverse driving MG2 torque TmR so as to be smaller than the required torque value (namely, by reducing the absolute value of the reverse driving MG2 torque TmR). The transmission shifting control portion 82 determines an amount of limitation of the reverse driving MG2 torque TmR such that the amount of limitation increases with a decrease of the engaging hydraulic pressure PRcb of the engaging-side coupling device CB at the moment at which the switch to the reverse driving of the vehicle 10 is required. The amount of limitation of the reverse driving MG2 torque TmR is larger where the reverse driving MG2 torque TmR is zeroed, than where the reverse driving MG2 torque TmR is controlled to be smaller than the required torque value. Further, the amount of limitation of the reverse driving MG2 torque TmR is larger where the forward driving MG2 torque TmF is generated by the second motor/generator MG2, than where the reverse driving MG2 torque TmR is zeroed. That is, the amount of limitation of the reverse driving MG2 torque TmR decreases with an increase of the reverse driving MG2 torque TmR toward the required value, and increases with an increase of the forward driving MG2 torque TmF.

The transmission shifting control portion 82 implements the control for promotion to establish the first speed AT gear position, by implementing the compensation control to raise the engaging hydraulic pressure PRcb of the engaging-side coupling device CB, and/or commanding the vehicle driving control portion 84 to limit the reverse driving MG2 torque TmR generated by the second motor/generator MG2.

The control mode A is established as the normal mode of control to implement the 2→1 coasting shift-down action of the step-variable transmission portion 20 for establishing the first speed AT gear position, such that the 2→1 coasting shift-down action progresses while both of the releasing-side and the engaging-side coupling devices CB are placed in the free state. On the other hand, the control mode B is established as the normal mode of control to implement the *→1 manual shift-down action of the step-variable transmission portion 20 for establishing the first speed AT gear position, such that the *→1 manual shift-down action progresses with the engaging-side coupling device CB generating the engaging torque Tcb. Therefore, the engaging hydraulic pressure PRcb of the engaging-side coupling device CB in the process of the 2→1 coasting shift-down action is lower than that in the process of the *→1 manual shift-down action. Accordingly, the transmission shifting control portion 82 implements the compensation control such that the amount of compensation to raise the engaging hydraulic pressure PRcb of the engaging-side coupling device CB in the process of the 2→1 coasting shift-down action is larger than that in the process of the *→1 manual shift-down action. These control modes A and B are applicable to the shifting action of the engaging-side coupling device CB to shift the step-variable transmission portion 20 from the neutral state back to the first speed AT gear position. Namely, the amount of compensation to raise the engaging hydraulic pressure PRcb applied to the engaging-side coupling device CB to establish the first speed AT gear position is changed depending upon whether the control mode A or the control mode B is established as the normal mode of control to re-establish the first speed AT gear position.

Thus, the transmission shifting control portion 82 changes the amount of compensation to raise the engaging hydraulic pressure PRcb of the engaging-side coupling device CB, according to the kind of control to establish the first speed AT gear position. Therefore, another parameter representative of the state of control of the engaging-side coupling device CB is the kind of control to establish the first speed AT gear position.

Described more specifically, the electronic control device 80 further includes state determining means in the form of a state determining portion 86, for controlling the vehicle 10 so as to reduce the risk of delay of generation of the reverse drive force.

The state determining portion 86 is configured to determine whether the *→R operation of the shift lever 56 has been performed, namely, whether switching from the forward driving of the vehicle 10 to its reverse driving is required. For instance, this determination is made on the basis of the presently selected operating position POSsh of the shift lever 56. The state determining portion 86 is further configured to determine whether the step-variable transmission portion 20 is in the process of control of a shifting action to the first speed AT gear position (namely, in the process of control of an engaging action of the engaging-side coupling device CB to establish the first speed AT gear position), while the shift lever 56 is placed in the operating position POSsh other than the reverse drive position R. For instance, this determination is made on the basis of the presently selected operating position POSsh of the shift lever 56, and the hydraulic control command signals Sat. The state determining portion 86 is also configured to determine whether the step-variable transmission portion 20 is in the process of the 2→1 coasting shift-down action. For example, this determination is made on the basis of the hydraulic control command signals Sat. The state determining portion 86 is further configured to determine whether the step-variable transmission portion 20 is in the process of the *→1 manual shift-down action. For example, this determination is made on the basis of the presently selected operating position POSsh of the shift lever 56, and the hydraulic control command signals Sat.

When the state determining portion 86 has determined that the *→R operation of the shift lever 56 has been performed, and that the step-variable transmission portion 20 is in the process of control to establish the first speed AT gear position with the shifter lever 56 being placed in the operating position POSsh other than the reverse drive position R, while the shifting action of the step-variable transmission portion 20 is the 2→1 coasting shift-down action, namely, the switching to the reverse driving of the vehicle 10 is required in the process of the 2→1 coasting shift-down action, the transmission shifting control portion 82 implements the compensation control for the 21 coasting shift-down action, in place of the normal control for the 2→1 coasting shift-down action. The transmission shifting control portion 82 implements the compensation control for the 2→1 coasting shift-down action, by raising the engaging hydraulic pressure PRcb of the engaging-side coupling device CB, to raise the AT input speed ωi toward the synchronizing speed ωisycl of the first speed AT gear position, for bringing the engaging-side coupling device CB into the engaged state. The transmission shifting control portion 82 implements the compensation control to raise the engaging hydraulic pressure PRcb of the engaging-side coupling device CB, by commanding the hydraulic control unit 54 to generate the engaging hydraulic pressure PRcb which is higher than the commanded value of the engaging hydraulic pressure PRcb in the process of a rise of the AT input speed ωi with a temporary increase of the AT input torque Ti in the normal mode of control of the 2→1 coasting shift-down action. Thus, when the switching to the reverse driving of the vehicle 10 is required in the process of the 2→1 coasting shift-down action, the transmission shifting control portion 82 controls the step-variable transmission portion 20 so as to permit the 2→1 coasting shift-down action to progress primarily by raising the engaging hydraulic pressure PRcb of the engaging-side coupling device CB to execute the 2→1 coasting shift-down action, rather than by temporarily increasing the AT input torque Ti of the step-variable transmission portion 20.

The transmission shifting control portion 82 implements the compensation control for the 2→1 coasting shift-down action, by commanding the vehicle driving control portion 84 to limit the reverse driving MG2 torque TmR generated by the second motor/generator MG2, in addition to the compensation to raise the engaging hydraulic pressure PRcb of the engaging-side coupling device CB. For example, the transmission shifting control portion 82 commands the vehicle driving control portion 84 to limit the reverse driving MG2 torque TmR generated by the second motor/generator MG2, until the engaging-side coupling device CB has been brought into its engaged state, that is, until it is determined that the AT input speed ωi has been raised to the synchronizing speed ωisycl of the first speed AT gear position.

When the engaging action of the engaging-side coupling device CB is completed, the transmission shifting control portion 82 cancels the command to the vehicle driving control portion 84 to limit the reverse driving MG2 torque TmR. After the command to limit the reverse driving MG2 torque TmR is cancelled, the vehicle driving control portion 84 initiates generation of the reverse driving MG2 torque TmR, so that the reverse drive torque is generated.

When the state determining portion 86 has determined that the *→R operation of the shift lever 56 has been performed, and that the step-variable transmission portion 20 is in the process of control to establish the first speed AT gear position with the shifter lever 56 being placed in the operating position POSsh other than the reverse drive position R, while the shifting action of the step-variable transmission portion 20 is the *→1 manual shift-down action, namely, the switching to the reverse driving of the vehicle 10 is required in the process of the *→1 manual shift-down action, the transmission shifting control portion 82 implements the compensation control for the *→1 manual shift-down action, in place of the normal control for the *→1 manual shift-down action. The transmission shifting control portion 82 implements the compensation control for the *→1 manual shift-down action, by raising the engaging hydraulic pressure PRcb of the engaging-side coupling device CB. The transmission shifting control portion 82 implements the compensation control to raise the engaging hydraulic pressure PRcb of the engaging-side coupling device CB, by commanding the hydraulic control unit 54 to generate the engaging hydraulic pressure PRcb which is higher than the commanded value of the engaging hydraulic pressure PRcb in the process of a progress of the *→1 manual shift-down action with the engaging torque Tcb being generated by the engaging-side coupling device CB in the normal mode of control of the *→1 manual shift-down action.

According to the compensation control for the *→1 manual shift-down action as well as the compensation control for the 2→1 coasting shift-down action, the transmission shifting control portion 82 commands the vehicle driving control portion 84 to limit the reverse driving MG2 torque TmR generated by the second motor/generator MG2, in addition to implementing the compensation to raise the engaging hydraulic pressure PRcb of the engaging-side coupling device CB.

Figure 7:
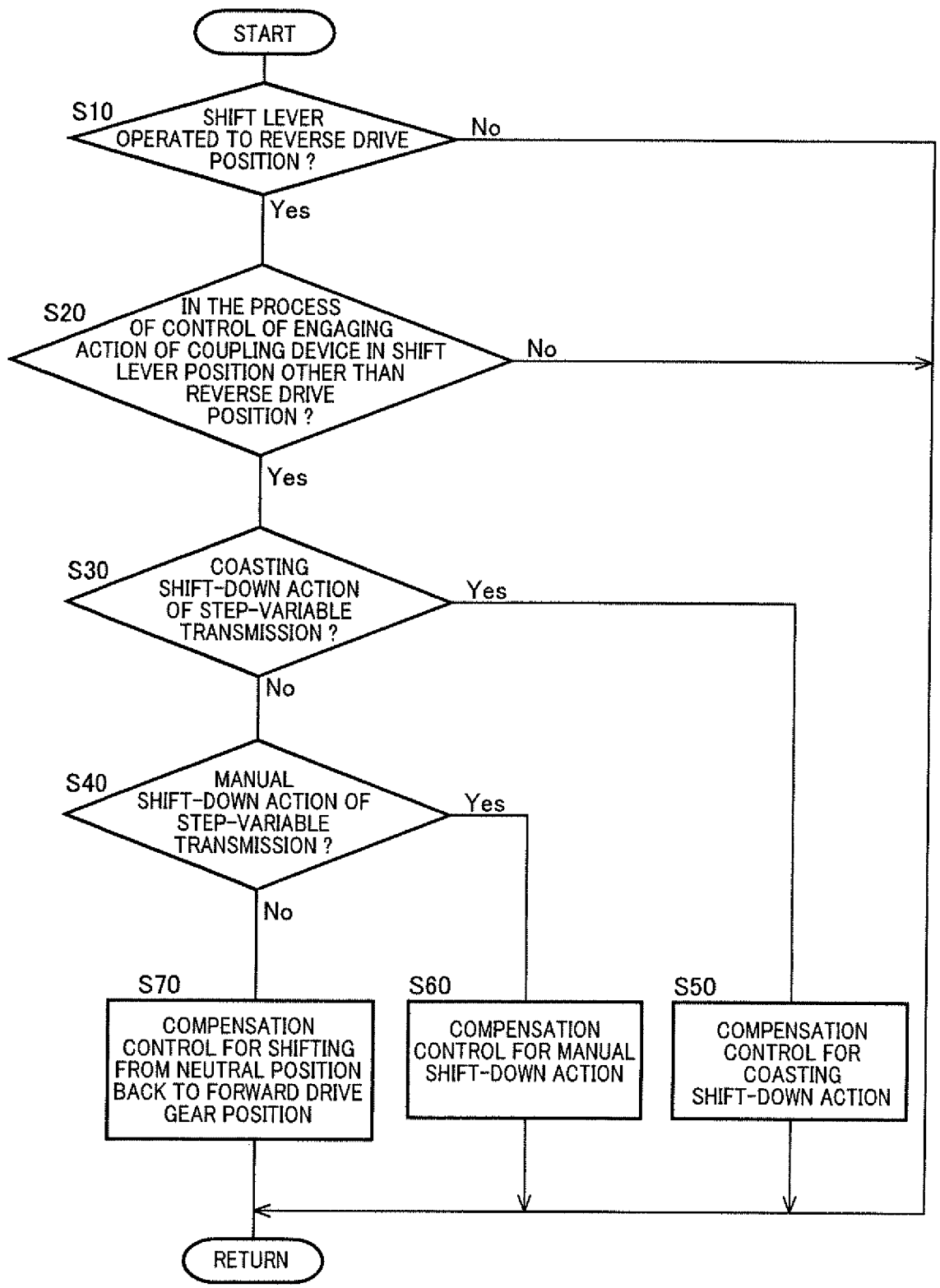
FIG. 7 is a flow chart illustrating an essential part of a control routine executed by an electronic control device, namely, a control operation implemented so as to reduce a risk of delay of generation of a reverse drive force upon a shift lever operation from a forward drive position to a reverse drive position in the process of a shifting action of the step-variable transmission portion to a first speed AT gear position.
Figure 8:
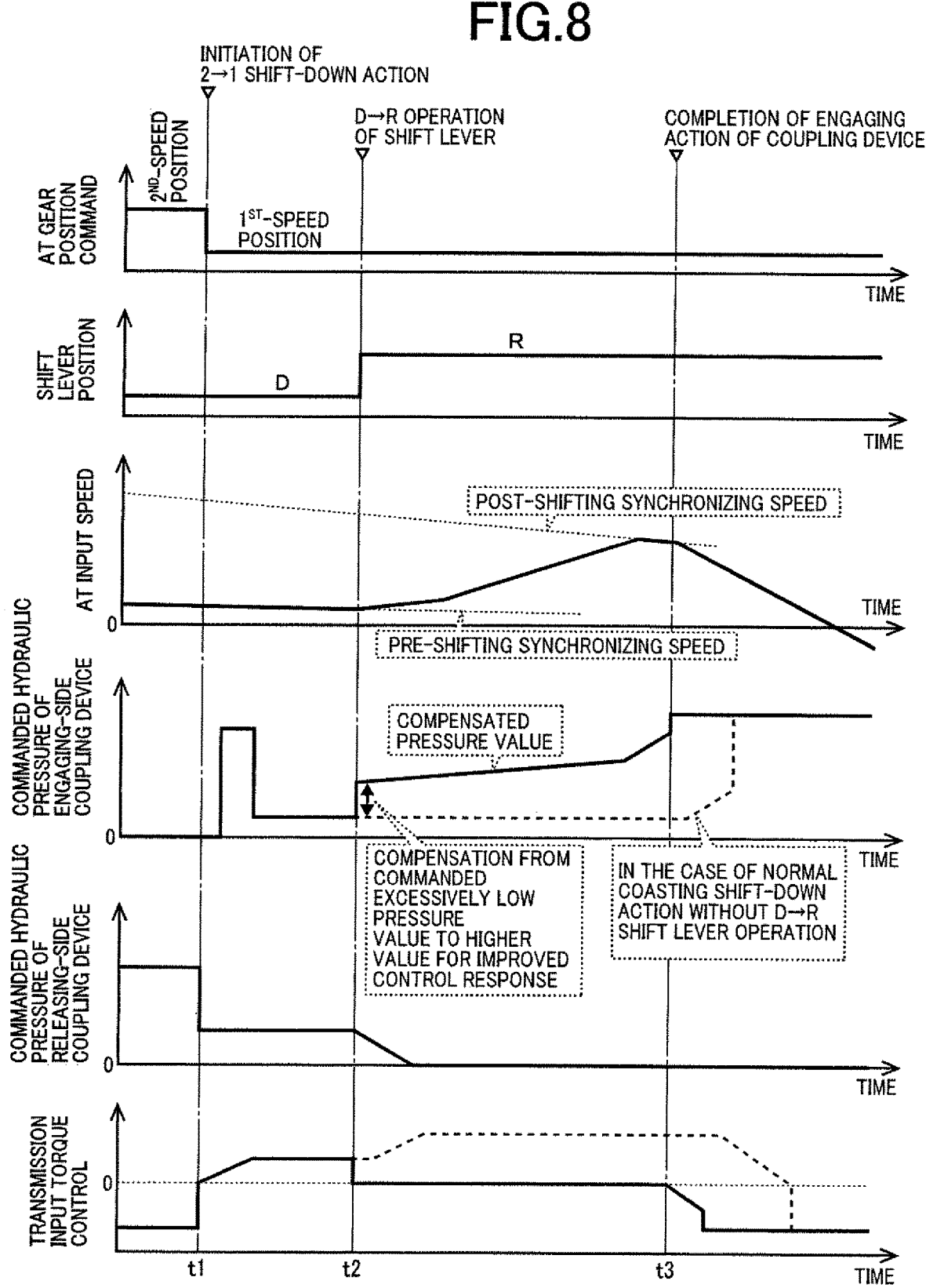
FIG. 8 is a time chart showing an example of changes of various parameters in the case of the shift lever operation from the forward drive position to the reverse drive position in the process of a coasting shift-down action of the step-variable transmission portion from a second-speed gear position to a first-speed gear position.
Figure 9:
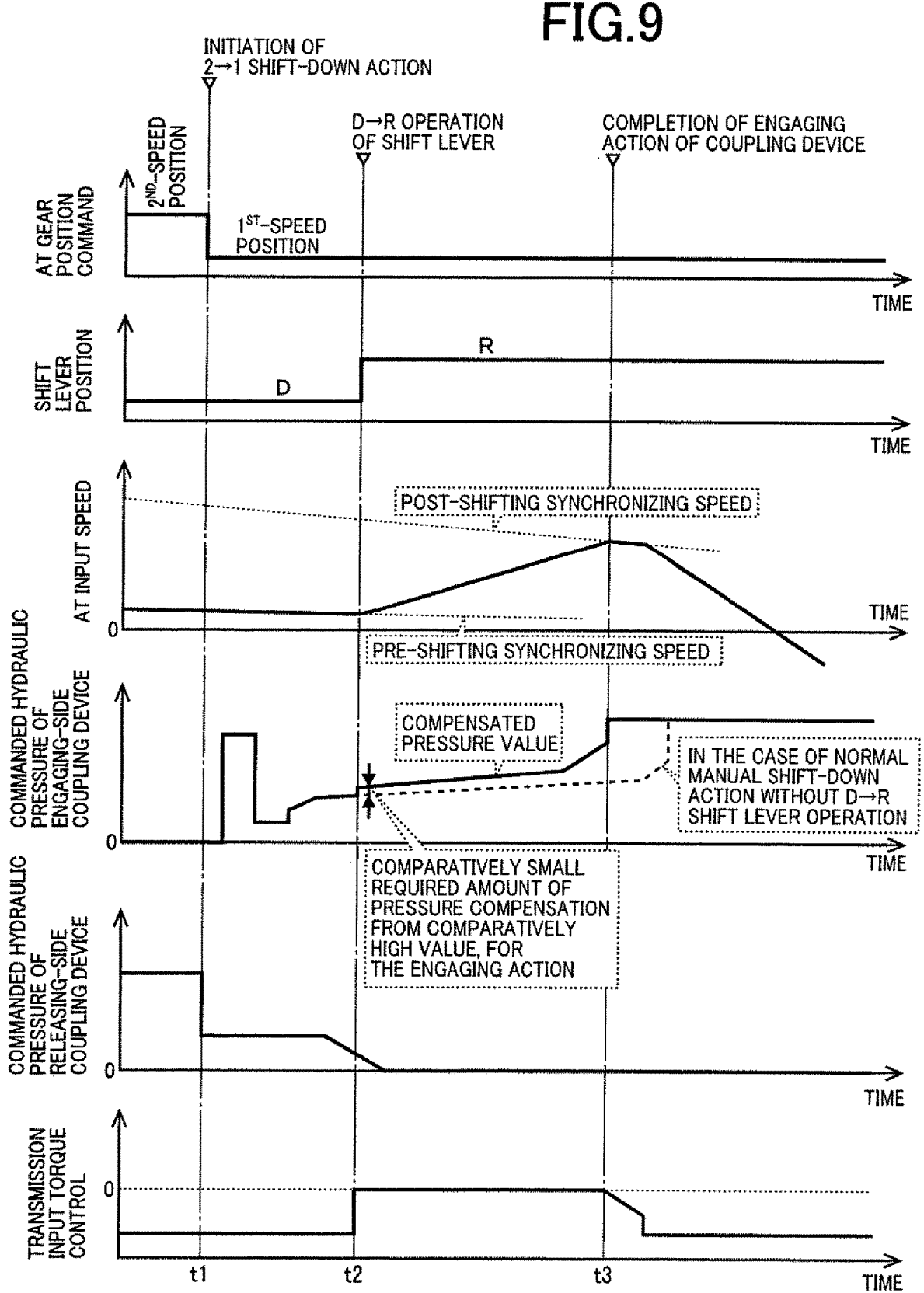
FIG. 9 is a time chart showing another example of changes of the parameters in the case of the shift lever operation from the forward drive position to the reverse drive position in the process of a manual shift-down action of the step-variable transmission portion from the second-speed gear position to the first-speed gear position.

FIG. 7 is the flow chart illustrating an essential part of a control routine executed by the electronic control device 80, namely, a control operation implemented so as to reduce the risk of delay of generation of the reverse drive force when the switching to the reverse driving of the vehicle 10 is required in the process of the shifting action of the step-variable transmission portion 20 to the first speed AT gear position. This control routine is repeatedly executed. FIGS. 8 and 9 are the flow charts illustrating examples of changes of various parameters when the control routine of FIG. 7 is executed.

The control routine is initiated with a step S10 corresponding to a function of the state determining portion 86, to determine whether the shifter lever 56 has been operated to the reverse drive position R (whether the *→R operation of the shift lever 56 has been performed). If a negative determination is obtained in the step S10, one cycle of execution of the present control routine is terminated. If an affirmative determination is obtained in the step S10, the control flow goes to a step S20 also corresponding to the function of the state determining portion 86, to determine whether the step-variable transmission portion 20 is in the process of a control of an engaging action of the engaging-side coupling device CB to establish the first speed AT gear position, in one of the operating positions POSsh of the shift lever 56 other than the reverse drive position R. If a negative determination is obtained in the step S20, one cycle of execution of the control routine is terminated. If an affirmative determination is obtained in the step S20, the control flow goes to a step S30 also corresponding to the function of the state determining portion 86, to determine whether the engaging action of the engaging-side coupling device CB is a 2→1 coasting shift-down action. If a negative determination is obtained in the step S30, the control flow goes to a step S40 also corresponding to the function of the state determining portion 86, to determine whether the engaging action of the engaging-side coupling device CB is a *→1 manual shift-down action. If an affirmative determination is obtained in the step S30, the control flow goes to a step S50 corresponding to a function of the transmission shifting control portion 82, to implement the compensation control for the 2→1 coasting shift-down action. If an affirmative determination is obtained in the step S40, the control flow goes to a step S60 also corresponding to the function of the transmission shifting control portion 82, to implement the compensation control for the *→1 manual shift-down action. If a negative determination is obtained in the step S40, the control flow goes to a step S70 also corresponding to the function of the transmission shifting control portion 82, to implement a compensation control for the shifting action of the step-variable transmission portion 20 being performed to establish the first speed AT gear position. Where the shifting action is performed to shift the step-variable transmission portion 20 from its neutral position back to the first speed AT gear position, for instance, the compensation control for the shifting action from the neutral state back to the first speed AT gear position is implemented in the step S70. Described more specifically, a compensation control similar to the compensation control for the 2→1 coasting shift-down action is implemented as the compensation control for the shifting action from the neutral position back to the first speed AT gear position, if the normal mode of control for re-establishing the first speed AT gear position is implemented in the control mode A in which the releasing-side and engaging-side coupling devices CB are placed in the free state.

FIG. 8 is the time chart showing an example of changes of various parameters in the case of the operation of the shift lever 56 to the reverse drive position R in the process of the 2→1 coasting shift-down action of the step-variable transmission portion 20. In FIG. 8, "t1" represents a point of time at which the 2→1 coasting shift-down action is initiated. When the 2→1 coasting shift-down action is initiated, the commanded value of the hydraulic pressure applied to the releasing-side coupling device CB is rapidly lowered, to bring the releasing-side coupling device CB into its released state, while the commanded value of the hydraulic pressure applied to the engaging-side coupling device CB is raised to a value for filling its hydraulic actuator, and is held at this value slightly lower than a value at which the engaging-side coupling device CB initiates generation of the engaging torque Tcb. During a time period from the point of time t1 to a point of time t2, a torque increasing control is implemented to temporarily increase the AT input torque Ti so as to be higher than the required value, while both of the releasing-side and engaging-side coupling devices CB are placed in the free states in which the engaging torque Tcb is not generated. Broken lines in FIG. 8 indicate the normal mode of control in which the torque increasing control is implemented (during a time period after the point of time t2) while the releasing-side and engaging-side coupling devices CB are placed in the free states. On the other hand, solid lines indicate the case where the compensation control for the 2→1 coasting shift-down action is implemented in place of the normal mode of control, during the time period after the point of time t2 at which the DR operation of the shift lever 56 is performed. In the compensation control for the 2→1 coasting shift-down action, the reverse driving MG2 torque TmR generated as a result of the DR operation of the shift lever 56 is limited, and the compensation to raise the engaging hydraulic pressure PRcb of the engaging-side coupling device CB is implemented during a time period from the point of time t2 to a point of time t3, so that the AT input speed ωi is raised toward the post-shifting synchronizing speed ωisycl. In the normal mode of control for the 2→1 coasting shift-down action, the commanded value of the hydraulic pressure applied to the engaging-side coupling device CB is lower than that in the normal mode of control for the *→1 manual shift-down action (illustrated in the time chart of FIG. 9 referred to below), and a larger amount of compensation of the engaging hydraulic pressure PRcb is required than in the compensation control for the *→1 manual shift-down action, for the purpose of improving the control response of the 2→1 coasting shift-down action. Accordingly, the 2→1 coasting shift-down action (namely, the engaging action of the engaging-side coupling device CB) can be implemented so as to progress in a desired manner, and so as to be completed at the point of time t3.

After the engaging action of the engaging-side coupling device CB is completed, the limitation of the reverse driving MG2 torque TmR is cancelled, and the normal output of the reverse driving MG2 torque TmR is initiated at the point of time t3. Thus, it is possible to reduce the risk of delay of progress of the 2→1 coasting shift-down action, and the risk of consequent delay of generation of the reverse driving force.

FIG. 9 is the time chart showing another example of changes of the parameters in the case of the operation of the shift lever 56 to the reverse drive position R in the process of the 2→1 manual shift-down action of the step-variable transmission portion 20. In FIG. 9, "t1" represents a point of time at which the 2→1 manual shift-down action is initiated. When the 2→1 manual shift-down action is initiated, the commanded value of the hydraulic pressure applied to the releasing-side coupling device CB is rapidly lowered, to bring the releasing-side coupling device CB into its released state, while the commanded value of the hydraulic pressure applied to the engaging-side coupling device CB is raised to permit the engaging-side coupling device CB to generate the engaging torque Tcb, so that the 2→1 manual shift-down action progresses during a time period from the point of time t1 to a point of time t2. Broken lines in FIG. 9 indicate the normal mode of control in which the 2→1 manual shift-down action progresses with the engaging torque Tcb being generated by the engaging-side coupling device CB during a time period after the point of time t2. On the other hand, solid lines indicate the case where the compensation control for the 2→1 manual shift-down action is implemented in place of the normal mode of control, during the time period after the point of time t2 at which the D→R operation of the shift lever 56 is performed. In the compensation control for the 2→1 manual shift-down action, the reverse driving MG2 torque TmR generated as a result of the D→R operation of the shift lever 56 is limited, and the compensation to raise the engaging hydraulic pressure PRcb of the engaging-side coupling device CB is implemented during a time period from the point of time t2 to a point of time t3. In the normal mode of control for the 2→1 manual shift-down action, the commanded value of the hydraulic pressure applied to the engaging-side coupling device CB is higher than that in the normal mode of control for the 2→1 coasting shift-down action (illustrated in the time chart of FIG. 8 referred to above), and a smaller amount of compensation of the engaging hydraulic pressure PRcb is required than in the compensation control for the 2→1 coasting shift-down action, to permit the engaging-side coupling device CB to be brought into its engaged state, namely, to permit the 2→1 manual shift-down action to progress. Accordingly, the 2→1 manual shift-down action (namely, the engaging action of the engaging-side coupling device CB) can be implemented so as to progress in a desired manner, and so as to be completed at the point of time t3. After the engaging action of the engaging-side coupling device CB is completed, the limitation of the reverse driving MG2 torque TmR is cancelled, and the normal output of the reverse driving MG2 torque TmR is initiated at the point of time t3. Thus, it is possible to reduce the risk of delay of progress of the 2→1 manual shift-down action, and the risk of consequent delay of generation of the reverse driving force.

The present embodiment described above is configured such that the control for promotion to establish the first speed AT gear position of the step-variable transmission portion 20 is implemented according to the state of control of the engaging-side coupling device CB to be brought into its engaged state, when the switching from the forward driving of the vehicle 10 to its reverse driving is required in the process of the shifting action of the step-variable transmission portion 20 to the first speed AT gear position, so that the first speed AT gear position can be easily established. Accordingly, it is possible to reduce the risk of delay of generation of the reverse drive force by the second motor/generator MG2 when the reverse driving of the vehicle 10 is required in the process of the shifting action of the step-variable transmission portion 20 to the first speed AT gear position. Further, the control for promotion to establish the first speed AT gear position is implemented according to the state of control of the engaging-side coupling device CB, so that a risk of excessive promotion to establish the first speed AT gear position can be reduced, whereby a risk of generation of the shifting shock of the step-variable transmission portion 20 can be accordingly reduced.

The present embodiment is further configured such that the transmission shifting control portion 82 implements the control for promotion to establish the first speed AT gear position, by implementing the compensation control to raise the engaging hydraulic pressure PRcb of the engaging-side coupling device CB, so that the first speed AT gear position can be easily established.

The present embodiment is also configured such that the amount of rise of the engaging hydraulic pressure PRcb of the engaging-side coupling device CB by the compensation control is increased with the decrease of the engaging hydraulic pressure PRcb at the moment at which the switching to the reverse driving of the vehicle 10 is required. Accordingly, the first speed AT gear position can be easily established, and the risk of generation of the shifting shock of the step-variable transmission portion 20 due to an excessively large amount of compensation of the engaging hydraulic pressure PRcb can be reduced.

The present embodiment is further configured such that the amount of compensation to raise the engaging hydraulic pressure PRcb of the engaging-side coupling device CB is changed according to the kind of control to establish the first speed AT gear position, and the control for promotion to establish the first speed AT gear position is implemented according to the kind of control to establish the first speed AT gear position. Accordingly, the first speed AT gear position can be easily established, and the risk of generation of the shifting shock due to an excessive amount of compensation of the engaging hydraulic pressure PRcb of the engaging-side coupling device CB can be reduced.

The present embodiment is also configured such that when the coasting shift-down action of the step-variable transmission portion 20 to the first speed AT gear position is implemented, the transmission shifting control portion 82 determines the amount of compensation to raise the engaging hydraulic pressure PRcb of the engaging-side coupling device CB such that the amount of compensation is larger when the coasting shift-down action is implemented than when the manual shift-down action is implemented. Thus, the control for promotion to establish the first speed AT gear position is suitably implemented depending upon whether the shift-down action to the first speed AT gear position is the coasting shift-down action or the manual shift-down action. Accordingly, even in both the coasting shift down and the manual shift down, the first speed AT gear position can be easily established, while the risk of generation of the engaging shock of the step-variable transmission portion 20 due to an excessively large amount of compensation to raise the engaging hydraulic pressure PRcb of the engaging-side coupling device CB can be suitably reduced.

The present embodiment is further configured such that when the switching from the forward driving of the vehicle 10 to its reverse driving is required in the process of the coasting shift-down action, the transmission shifting control portion 82 controls the engaging-side coupling device CB to be brought into the engaged state, by implementing the compensation control to raise the engaging hydraulic pressure PRcb of the engaging-side coupling device CB to raise the input speed $\omega i$ of the step-variable transmission portion 20 toward the synchronizing speed $\omega i sycl$ of the first speed AT gear position. Accordingly, the coasting shift-down action of the step-variable transmission portion 20 can progress even if the rise of the input speed $\omega i$ toward the synchronizing speed $\omega i sycl$ by a temporary increase of the forward driving MG2 torque TmF generated by the second motor/generator MG2 so as to be larger than the required value is interrupted by the requirement for switching from the forward driving of the vehicle 10 to its reverse driving. Thus, it is possible to reduce the risk of delay of generation of the reverse drive force due to the requirement for switching to the reverse driving of the vehicle 10 in the process of the coasting shift-down action of the step-variable transmission portion 20.

The present embodiment is also configured such that when the switching from the forward driving of the vehicle 10 to its reverse driving is required in the process of the manual shift-down action, the transmission shifting control portion 82 implements the compensation control to raise the engaging hydraulic pressure PRcb of the engaging-side coupling device CB, so that the manual shift-down action can easily progress. Thus, it is possible to reduce the risk of delay of generation of the reverse drive force due to the requirement for switching to the reverse driving of the vehicle 10 in the process of the manual shift-down action of the step-variable transmission portion 20.

The present embodiment is also configured such that the control for promotion to establish the first speed AT gear position of the step-variable transmission portion 20 is implemented by limiting the reverse driving MG2 torque TmR generated by the second motor/generator MG2. Accordingly, the difficulty of the input speed $\omega i$ of the step-variable transmission portion 20 to approach the synchronizing speed $\omega i sycl$ of the first speed AT gear position is reduced, so that the first speed AT gear position can be easily established.

A second embodiment of this invention will be described. It is noted that the same reference signs as used in the first embodiment will be used to identify the elements of the second embodiment corresponding to those of the first embodiment, and that those elements will not be redundantly described.

Second Embodiment

Figure 10:
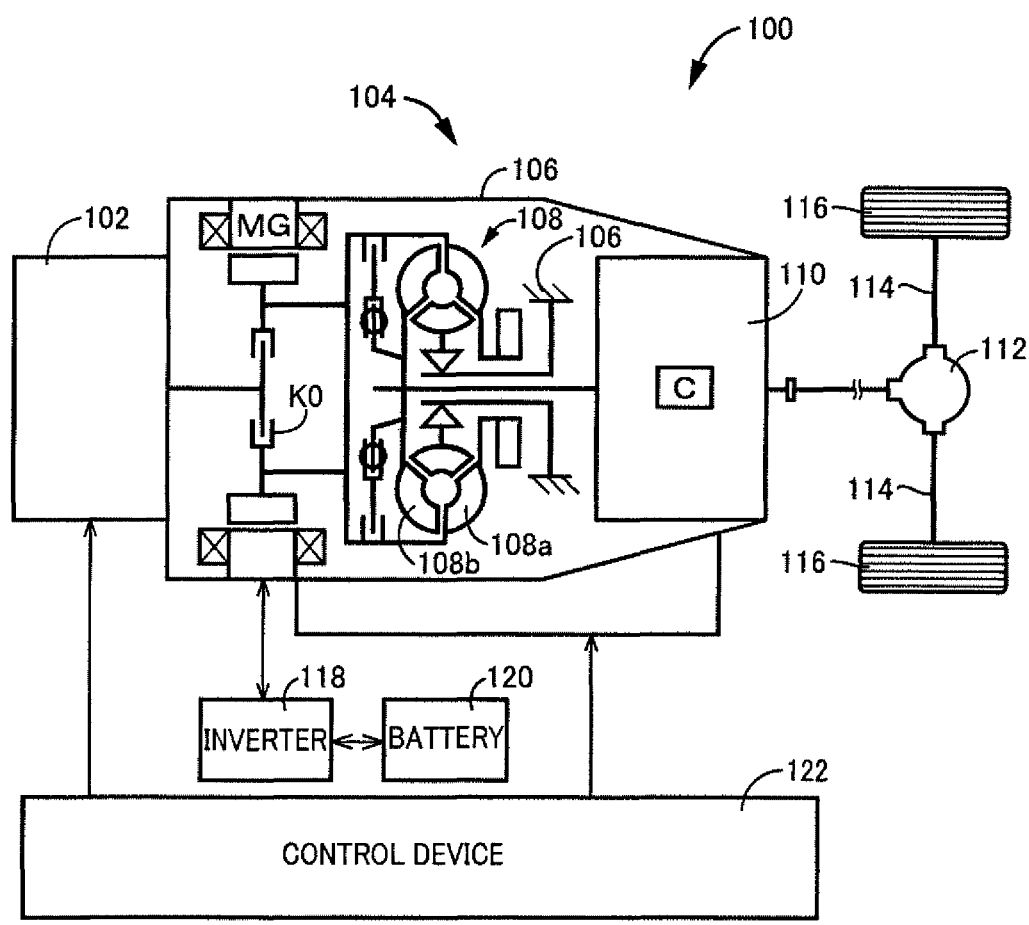
FIG. 10 is a schematic view showing an arrangement of a vehicular drive system different from that of FIG. 1, which is to be controlled by the control apparatus according to the present invention.

In this second embodiment, the control apparatus according to the invention is used for controlling a vehicle 100 shown in FIG. 10, which is different from the vehicle 10 in the first embodiment in which the continuously variable transmission portion 18 and the step-variable transmission portion 20 are connected in series with each other.

As shown in FIG. 10, the vehicle 100 is a hybrid vehicle provided with an engine 102 functioning as a drive power source, a motor/generator MG also functioning as the drive power source, and a power transmitting system 104. The power transmitting system 104 is provided with a clutch K0, a torque converter 108, and an automatic transmission 110, which are disposed within a stationary member in the form of a casing 106 fixed to a body of the vehicle 100, in this order of description as seen in the direction from the engine 102. The power transmitting system 104 further includes a differential gear device 112, and axles 114. The torque converter 108 has a pump impeller 108*a* selectively connected to the engine 102 through the clutch K0 and directly connected to the motor/generator MG, and a turbine impeller 108*b* directly connected to the automatic transmission 110. In the power transmitting system 104, a drive force of the engine 102 and/or a drive force of the motor/generator MG are/is transmitted to drive wheels 116 of the vehicle 100 through the clutch K0 (where the drive force of the engine 102 is transmitted), the torque converter 108, the automatic transmission 110, the differential gear device 112 and the axles 114, in this order of description. The automatic transmission 110 is a mechanically operated transmission mechanism which constitutes a part of a power transmitting path between the drive power source (engine 102 and motor/generator MG) and the drive wheels 116. Like the step-variable transmission portion 20 in the first embodiment described above, the automatic transmission 110 is a known planetary gear type automatic transmission which is shifted to a selected one of a plurality of gear positions with an engaging action of one of a plurality of coupling devices C. The vehicle 100 is further provided with: an inverter 118; an electric power storage device in the form of a battery 120 to and from which an electric power is respectively supplied from and to the motor/generator MG through the inverter 118; and a control device 122.

The control device 122 is configured to selectively establish a motor drive mode in which the vehicle 100 is driven with only the motor/generator MG operated as the drive power source with electric power supplied from the battery 120 while the engine 102 is held at rest, in the released state of the clutch K0, or a hybrid drive mode in which the vehicle 100 is driven with the engine 102 operated as the drive power source, in the engaged state of the clutch K0. In the hybrid drive mode established by the control device 122, a drive torque generated by the motor/generator MG with the electric power supplied from the battery 120 may be added to the drive force generated by the engine 102, or the motor/generator MG may be operated as an electric generator with the drive force of the engine 102, so that the battery 120 is charged with the electric power generated by the motor/generator MG. Thus, the motor/generator MG is an electrically operated rotary device having a function of an electric motor and a function of an electric generator. An output torque (vehicle driving torque or regenerative torque) of the motor/generator MG is controlled by the inverter 118 under the control of the control device 122.

The control device 122 has the functions of the transmission shifting control portion 82, vehicle driving control portion 84 and state determining portion 86, which are incorporated in the electronic control device 80 according to the above-described first embodiment. Like the electronic control device 80, the control device 122 is configured to implement a control for reducing a risk of delay of generation of a reverse drive force when reverse driving of the vehicle is required in the process of a shifting action of the automatic transmission 110 to a forward-drive low-speed gear position.

The present second embodiment has the same advantages as the first embodiment previously described.

While the preferred embodiments of this invention have been described in detail by reference to the drawings, it is to be understood that the invention may be otherwise embodied.

In the illustrated first embodiment, one parameter representative of the state of control of the engaging-side coupling device CB is the engaging hydraulic pressure PRcb of the engaging-side coupling device CB at the moment at which the switching from the forward driving of the vehicle 10 to its reverse driving is required. The engaging hydraulic pressure PRcb of the engaging-side coupling device CB at the moment at which the switching from the forward driving of the vehicle 10 to its reverse driving is required can be considered to represent the degree of progress of the shifting action of the step-variable transmission portion 20 to the first speed AT gear position. The degree of progress of the shifting action to the first speed AT gear position may be represented by a speed difference $\Delta\omega i$ between the present AT input speed $\omega i$ and the synchronizing speed $\omega isycl$ of the first speed AT gear position, or a speed difference between rotating speeds of the input and output rotary members of the engaging-side coupling device CB. In the case of a shift-down action of the step-variable transmission portion 20 to the first speed AT gear position, the degree of progress of the shift-down action may be represented depending upon whether the inertia phase of the shift-down action has been initiated or not. Accordingly, the parameters representative of the state of control of the engaging-side coupling device CB include: the degree of progress of the shift-down action; the speed difference $\Delta\omega i$; the speed difference of the engaging-side coupling device CB; and a result of determination as to whether the inertia phase of the shift-down action has been initiated or not. Further, the AT input torque Ti is also considered to have an influence on the degree of progress of the shifting action to the first speed AT gear position. In this respect, the AT input torque Ti may be used as the parameter representative of the state of control of the engaging-side coupling device CB.

In the first embodiment, the 2→1 coasting shift-down action, the *→1 manual shift-down action, and the shifting action from the neutral state back to the first speed AT gear position are illustrated as the three different kinds of control to establish the first speed AT gear position. In the vehicle 10, the step-variable transmission portion 20 may be shifted as a result of reduction of the vehicle running speed V while the operating position POSsh is the neutral position N during running of the vehicle 10, and the transmission device 40 is placed in the neutral state with the continuously variable transmission portion 18 being placed in the neutral state. Accordingly, the principle of this invention is equally applicable to the control for promotion to establish the first speed AT gear position from the neutral state of the step-variable transmission portion 20 while the continuously variable transmission portion 18 is placed in the neutral state.

In the illustrated first embodiment, the normal control of the 2→1 coasting shift-down action is implemented so as to temporarily raise the AT input torque Ti for permitting the 2→1 coasting shift-down action to progress, while both of the releasing-side and engaging-side coupling devices CB are placed in the free states in which the engaging torque Tcb is not generated. However, the normal control of the 2→1 coasting shift-down action may be implemented so as to progress primarily by temporarily increasing the AT input torque Ti, with the engaging-side coupling device CB generating the engaging torque Tcb.

In the illustrated first embodiment, the first speed AT gear position is an example of the forward-drive low-speed gear position. However, the second speed AT gear position as well as the first speed AT gear position may be the forward-drive low-speed gear position when the vehicle can execute reverse running with the second AT gear position. In this case, the control for promotion to establish the forward-drive low-speed gear position is the control for promotion to establish the first speed AT gear position and/or the second speed AT gear position.

In the illustrated first embodiment, the step-variable transmission portion 20 does not have a reverse drive AT gear position which is to be established exclusively for reverse driving of the vehicle 10 and in which the direction of the input rotary motion is reversed for the reverse driving of the vehicle 10. However, the step-variable transmission portion 20 may have a reverse drive AT gear position to be established exclusively for the reverse driving of the vehicle 10. Further, the principle of the present invention is equally applicable to a vehicle wherein the step-variable transmission portion 20 has the reverse drive AT gear position exclusively used for the reverse driving of the vehicle, and also a forward drive AT gear position which may be used for the reverse driving.

In the illustrated first embodiment, the vehicle 10 is provided with the differential mechanism 32 in the form of a planetary gear set of a single-pinion type, and the continuously variable transmission portion 18 functioning as an electrically controlled transmission mechanism. However, the continuously variable transmission portion 18 may be a transmission mechanism the differential state of which is limited by controlling a clutch or brake connected to one of the rotary elements of the differential mechanism 32. Further, the differential mechanism 32 may be a planetary gear set of a double-pinion type, or may be replaced by a differential mechanism which includes a plurality of planetary gear sets having four or more rotary elements. Further, the differential mechanism 32 may be replaced by a differential gear device including a pinion rotated by the engine 14, and a pair of bevel gears which mesh with the pinion and to which the first motor/generator MG1 and the intermediate power transmitting member 30 are respectively connected. Further, the differential mechanism 32 may be replaced by a mechanism which includes two or more planetary gear sets rotary elements of which are connected to each other and/or operatively connected to the engine, motor/generator and drive wheels, in power transmittable manner.

The vehicle 100 in the second embodiment may not be provided with the engine 102, the clutch K0 and the torque converter 108. In this case, the motor/generator MG is connected directly to an input rotary member of the automatic transmission 110. Namely, the control apparatus according to the present invention is applicable to a vehicle which is provided with a motor/generator functioning as a drive power source, and an automatic transmission which constitutes a part of a power transmitting path between the motor/generator and drive wheels. While the vehicle 100 uses the torque converter 108 as a fluid-operated power transmitting device, the vehicle 100 may use other types of fluid-operated power transmitting devices such as a fluid coupling, which do not have a torque boosting function. Further, the torque converter 108 need not be provided, or may be replaced by a device having a simple clutch function.

In the illustrated embodiments, the step-variable transmission portion 20 or the automatic transmission 110 is provided as a step-variable transmission which constitutes a part of a power transmitting path between the motor/generator and the drive wheels and which is shifted to a selected one of a plurality of gear positions with an engaging action of one of a plurality of coupling devices. This step-variable transmission may be replaced by any other type of known automatic transmission such as an automatic transmission of a planetary gear type similar to the step-variable transmission portion 20, or a synchronous meshing parallel two-axes type automatic transmission such as a DCT (Dual Clutch Transmission) which has two input shafts to which coupling devices (clutches and brakes) are connected to respectively establish even-numbered and odd-numbered gear positions. In the DCT, one of a plurality of coupling devices or one of the coupling devices which is associated with a shifting action of the DCT is selectively connected to each of the two input shafts.

In the illustrated first embodiment, the ten overall speed positions are established for the four AT gear appositions. Although the number of the overall speed positions may be equal to the number of the AT gear positions, the number of the overall speed positions is preferably larger than the number of the AT gear positions, for instance, twice or more of the number of the AT gear positions. The numbers of the AT gear positions and the overall speed positions are suitably determined, as long as the step-variable transmission portion is shifted such that the rotating speed of the intermediate power transmitting member 30 and the operating speed of the second motor/generator MG2 connected to the intermediate power transmitting member 30 are held within respective predetermined ranges, and the transmission device 40 is shifted such that the engine speed $\omega e$ is held within a predetermined range.

In the illustrated first embodiment, the manual shifting position M which is one of the operating positions POSsh of the shift lever 56 is the position in which the transmission device 40 can be shifted according to a manual operation of the shift lever 56 by the vehicle operator. However, the transmission device 40 may be otherwise manually shifted in the manual shifting position M. For instance, the transmission device 40 may be manually shifted by operating the shift lever 56 to the manual shifting position M by changing the available highest high-speed gear position to which the transmission device 40 can be automatically shifted.

It is to be understood that the embodiments and modifications described above are given for illustrative purpose only, and that the present invention may be embodied with various other changes and improvements which may occur to those skilled in the art.

NOMENCLATURE OF ELEMENTS

10: Vehicle
14: Engine
18: Electrically controlled continuously variable transmission portion (Electrically controlled transmission mechanism)
20: Mechanically operated step-variable transmission portion (Automatic transmission)
28: Drive wheels
30: Intermediate power transmitting member (Output rotary member of electrically controlled transmission mechanism)
32: Differential mechanism
80: Electronic control device (Control apparatus)
82: Transmission shifting control portion
84: Vehicle driving control portion
CB: Coupling devices
MG1: First motor/generator
MG2: Second motor/generator (Motor/generator)
100: Vehicle
110: Automatic transmission
116: Drive wheels
122: Control device
C: Coupling devices MG: Motor/generator

What is claimed is:

1. A control apparatus for a vehicle provided with a motor/generator functioning as a drive power source, and an automatic transmission which constitutes a part of a power transmitting path between the motor/generator and drive wheels and which is shifted to a selected one of a plurality of gear positions with an engaging action of one of a plurality of coupling devices, the control apparatus comprising:
   a vehicle driving control portion configured to permit reverse driving of the vehicle in a reverse direction while the automatic transmission is placed in a forward-drive low-speed gear position of the plurality of gear positions, with the motor/generator being operated in a negative direction opposite to a positive direction for forward driving of the vehicle, to generate a negative reverse driving torque opposite to a positive forward driving torque for the forward driving; and
   a transmission shifting control portion configured to implement a control for promotion to establish the forward-drive low-speed gear position of the automatic transmission, when switching from the forward driving of the vehicle to its reverse driving is required in the process of a shifting action of the automatic transmission to the forward-drive low-speed gear position, the transmission shifting control portion implementing the control for promotion to establish the forward-drive low-speed gear position, according to a state of control of the engaging-side coupling device to be brought into its engaged state for establishing the forward-drive low-speed gear position.

2. The control apparatus according to claim 1, wherein the transmission shifting control portion implements the control for promotion to establish the forward-drive low-speed gear position, by implementing a compensation control to raise an engaging pressure of the engaging-side coupling device.

3. The control apparatus according to claim 2, wherein the state of control of the engaging-side coupling device is represented by the engaging pressure of the engaging-side coupling device at a moment at which the switching to the reverse driving of the vehicle is required, and the transmission shifting control portion increases an amount of rise of the engaging pressure of the engaging-side coupling device by the compensation control, with a decrease of the engaging pressure at the moment at which the switching to the reverse driving of the vehicle is required.

4. The control apparatus according to claim 2, wherein the state of control of the engaging-side coupling device is represented by a kind of control to establish the forward-drive low-speed gear position, and the transmission shifting control portion changes an amount of compensation to raise the engaging pressure of the engaging-side coupling device according to the kind of control to establish the forward-drive low-speed gear position.

5. The control apparatus according to claim 4, wherein when a coasting shift-down action of the automatic transmission to the forward-drive low-speed gear position is implemented, the transmission shifting control portion commands the motor/generator to temporarily increase the forward driving torque so as to be larger than a required value, to temporarily increase an input torque of the automatic transmission, for thereby raising an input speed of the automatic transmission toward a synchronizing speed of the forward-drive low-speed gear position, and brings the engaging-side coupling device into the engaged state when the input speed has been raised to a predetermined value, and wherein when a manual shift-down action of the automatic transmission to the forward-drive low-speed gear position is implemented as a result of an operation of a manually operated shifting member by an operator of the vehicle, the transmission shifting control portion controls the engaging-side coupling device to be brought into the engaged state, by raising the engaging pressure of the engaging-side coupling device to raise the input speed of the automatic transmission toward the synchronizing speed of the forward-drive low-speed gear position,
   and further wherein when the coasting shift-down action of the automatic transmission to the forward-drive low-speed gear position is implemented, the transmission shifting control portion determines the amount of compensation to raise the engaging pressure of the engaging-side coupling device such that the amount of compensation is larger when the coasting shift-down action is implemented than when the manual shift-down action is implemented.

6. The control apparatus according to claim 1, wherein the state of control of the engaging-side coupling device is represented by a kind of control to establish the forward-drive low-speed gear position, and when a coasting shift-down action of the automatic transmission to the forward-drive low-speed gear position is implemented, the transmission shifting control portion commands the motor/generator to temporarily increase the forward driving torque so as to be larger than a required value, to temporarily increase an input torque of the automatic transmission, for thereby raising an input speed of the automatic transmission toward a synchronizing speed of the forward-drive low-speed gear position, and brings the engaging-side coupling device into the engaged state when the input speed has been raised to a predetermined value,
   and wherein when the switching from the forward driving of the vehicle to its reverse driving is required in the process of the coasting shift-down action, the transmission shifting control portion controls the engaging-side coupling device to be brought into the engaged state, by implementing a compensation control to raise an engaging pressure of the engaging-side coupling device to raise the input speed of the automatic transmission toward the synchronizing speed of the forward-drive low-speed gear position.

7. The control apparatus according to claim 1, wherein the state of control of the engaging-side coupling device is represented by a kind of control to establish the forward-drive low-speed gear position, and when a manual shift-down action of the automatic transmission to the forward-drive low-speed gear position is implemented as a result of an operation of a manually operated shifting member by an operator of the vehicle, the transmission shifting control portion controls the engaging-side coupling device to be brought into the engaged state, by raising an engaging pressure of the engaging-side coupling device to raise an input speed of the automatic transmission toward a synchronizing speed of the forward-drive low-speed gear position,
   and wherein when the switching from the forward driving of the vehicle to its reverse driving is required in the process of the manual shift-down action, the transmission shifting control portion implements a compensation control to raise an engaging pressure of the engaging-side coupling device.

8. The control apparatus according to claim 1, wherein the transmission shifting control portion implements the control for promotion to establish the forward-drive low-speed gear position of the automatic transmission, by limiting the reverse driving torque generated by the motor/generator.

9. The control apparatus according to claim 1, wherein the vehicle is further provided with an engine also functioning as the drive power source, and an electrically controlled transmission mechanism which has a differential mechanism operatively connected to the engine in a power transmittable manner, and a first motor/generator operatively connected to the differential mechanism in a power transmittable manner, and wherein a differential state of the differential mechanism is controlled according to an operating state of the first motor/generator, and wherein said motor/generator is a second motor/generator operatively connected to an output rotary member of the electrically controlled transmission mechanism.

* * * * *